(12) United States Patent
Gretz

(10) Patent No.: US 7,329,144 B1
(45) Date of Patent: Feb. 12, 2008

(54) ELECTRICAL FITTING FOR SNAP IN CONNECTION OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/726,150

(22) Filed: Mar. 21, 2007

Related U.S. Application Data

(63) Continuation-in-part of application No. 11/521,957, filed on Sep. 15, 2006, now Pat. No. 7,226,309, which is a continuation-in-part of application No. 11/494,665, filed on Jul. 27, 2006, now Pat. No. 7,154,054, and a continuation-in-part of application No. 11/494,663, filed on Jul. 27, 2006, now Pat. No. 7,161,095, which is a continuation-in-part of application No. 11/300,859, filed on Dec. 15, 2005, now Pat. No. 7,238,894.

(51) Int. Cl.
*H01R 13/58* (2006.01)

(52) U.S. Cl. ...................................... 439/460
(58) Field of Classification Search ................ 439/460, 439/463, 470; 174/660, 656, 661
See application file for complete search history.

(56) References Cited

U.S. PATENT DOCUMENTS

| 2,540,999 | A | | 2/1951 | Thomas, Jr. |
| 2,639,927 | A | | 5/1953 | Billeter |
| 2,973,212 | A | | 2/1961 | Rose |
| 6,241,553 | B1 | * | 6/2001 | Hsia ........................... 439/578 |
| 6,521,831 | B1 | | 2/2003 | Gretz |
| 7,045,714 | B1 | | 5/2006 | Kiely |
| 7,148,431 | B2 | * | 12/2006 | Pyron ......................... 174/656 |
| 7,151,223 | B2 | | 12/2006 | Auray et al. |
| 7,154,042 | B2 | | 12/2006 | Auray et al. |

* cited by examiner

*Primary Examiner*—Phuong Dinh

(57) ABSTRACT

An electrical fitting for securing two electrical cables to a panel or an electrical box. The electrical fitting includes a connector body having a leading body portion and a trailing body portion. The leading body portion may include a snap ring for snap-in connection to the panel or box or a threaded nose portion and lock nut. The trailing body portion includes two inlet bores therein for the insertion of electrical cables. A transverse wall at the front of the trailing body portion separates the inlet bores a single outlet bore. The transverse wall includes oval-shaped openings therein. Each oval-shaped opening in the transverse wall aligns with one of the inlet bores thereby enabling wire conductors extending from the electrical cables to easily pass through the openings and the outlet bore.

14 Claims, 37 Drawing Sheets

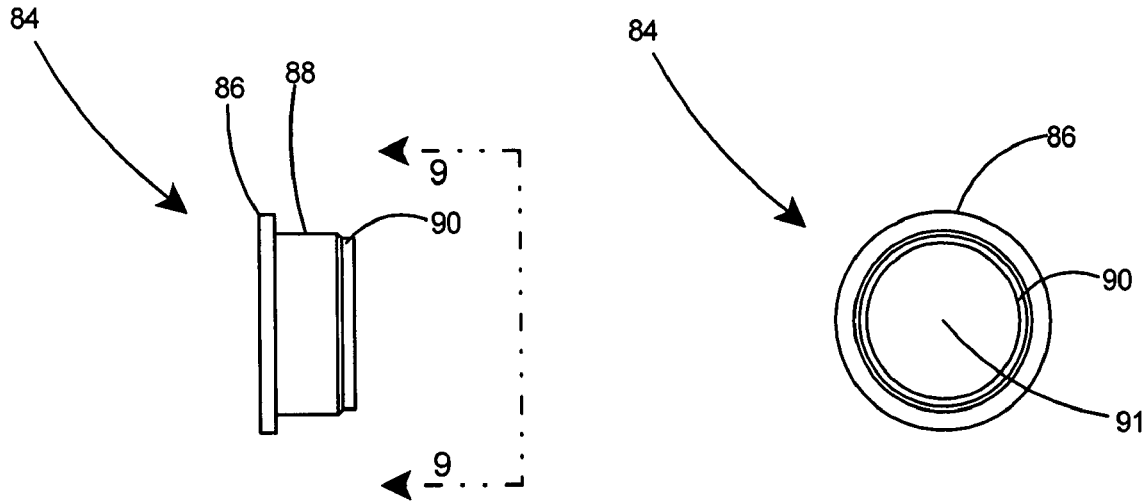
Fig. 8
Fig. 9
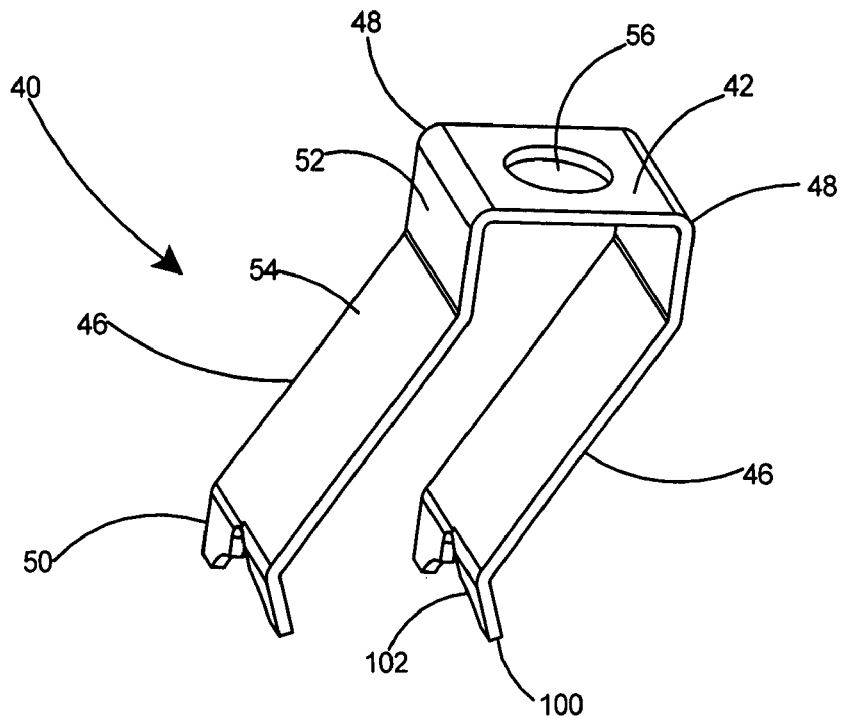
Fig. 10

US 7,329,144 B1

ELECTRICAL FITTING FOR SNAP IN CONNECTION OF CABLES

This application is a Continuation-In-Part of U.S. patent application Ser. No. 11/521,957 filed Sep. 15, 2006, now U.S. Pat. No. 7,226,309, which is a Continuation-In-Part of U.S. patent application Ser. No. 11/494,665 filed Jul. 27, 2006, now U.S. Pat. No. 7,154,054 and a Continuation-In-Part of U.S. patent application Ser. No. 11/494,663 filed Jul. 27, 2006, now U.S. Pat. No. 7,161,095, which patents are Continuation-In-Parts of U.S. patent application Ser. No. 11/300,859 filed Dec. 15, 2005, now U.S. Pat. No. 7,238,894.

FIELD OF THE INVENTION

This invention relates to fittings for connecting electrical cables to a panel or an electrical box and specifically to a duplex electrical fitting having an improved arrangement on the trailing end for receiving electrical cables.

BACKGROUND OF THE INVENTION

Electrical fittings having an improved arrangement on the trailing end for the attachment of electrical cables were disclosed in co-pending U.S. application Ser. Nos. 11/300,859 and 11/521,95 and in U.S. Pat. Nos. 7,154,054 and 7,161,095, which are commonly owned by the assignee of the present invention and the contents of which are incorporated herein in their entirety by reference thereto. Instead of the split ring being located within the tubular body as shown in prior art electrical fittings, the improved arrangement included single or tandem cable gripping tangs that are fastened externally to the tubular body and therefore are easily accessible.

The present invention provides an electrical fitting that incorporates the several advantages of the electrical fitting of U.S. Pat. No. 7,161,095 while improving that fitting by providing a wider internal passageway for the insertion therein of two electrical cables into the fitting. The electrical fitting of the present invention includes two oval openings of increased size at the front of each inlet bore on the trailing end of the fitting thereby enabling easier insertion of electrical cables through the fitting. With the duplex fitting of the present invention, the insertion of the electrical cables through the electrical fitting is much less restricted when the electrical cables are secured thereto to the trailing end of the connector. The electrical connector of the present invention thereby enables easier insertion of electrical cables into the inlet bores at the trailing end of the connector.

SUMMARY OF THE INVENTION

The invention is an electrical fitting for securing two electrical cables to a panel or an electrical box. The electrical fitting includes a connector body having a leading body portion and a trailing body portion. The leading body portion may include a snap ring for snap-in connection to the panel or box or a threaded nose portion and lock nut. The trailing body portion includes two inlet bores therein for the insertion of electrical cables. A transverse wall at the front of the trailing body portion separates the inlet bores a single outlet bore. The transverse wall includes oval-shaped openings therein. Each oval-shaped opening in the transverse wall aligns with one of the inlet bores thereby enabling wire conductors extending from the electrical cables to easily pass through the openings and the outlet bore.

OBJECTS AND ADVANTAGES

Several advantages are achieved with the electrical fitting of the present invention, including:
(1) The fitting includes an internal wall with wider internal openings that enable easy insertion of electrical cables into the trailing end of the fitting. The wider openings enable the stripped wiring at the front of the electrical cables to easily advance to the front of the fitting while the internal wall stops the advance of the electrical cable jacket within the fitting.
(2) The fitting will typically accommodate cables of multiple trade sizes. This enables a few sizes of fittings to accommodate the entire range of standard cable sizes available and therefore reduces stocking requirements of the fittings.
(3) The fitting includes gripping members that are located external to the tubular body, thereby permitting longer gripping members that allow insertion of cables with less force than is typically required in prior art fittings.
(4) The increased length of the gripping members permits them to be cantilevered over a greater distance, thereby increasing their flexibility and enabling easier insertion of cables.
(5) An internal ring with gripping members is not required, thereby simplifying the production of the fitting and reducing the cost of manufacture.
(6) As a result of the increased length and flexibility of the gripping members, cables can easily be released when such is desired.
(7) As a result of the large leading opening and the attachment of the tandem tangs on the exterior of the duplex electrical fitting, a straight-through path is available for insertion of each of the two cables. Prior art fittings utilizing frustoconical snap rings greatly reduce the diameter of the leading opening thereby causing an obstruction to any cables being inserted therein as a result of the necked down shoulder and the small leading opening.

These and other objects and advantages of the present invention will be better understood by reading the following description along with reference to the drawings.

DESCRIPTION OF THE DRAWINGS

FIG. 8 is a side view of an insert that is used in conjunction with the electrical fitting of FIG. 1.
FIG. 9 is an end view of the insert taken from line 9-9 of FIG. 8.
FIG. 10 is a perspective view of a clip member that forms a portion of the electrical fitting of FIG. 1.

INDEX TO REFERENCE NUMERALS IN DRAWINGS

Figure 1:
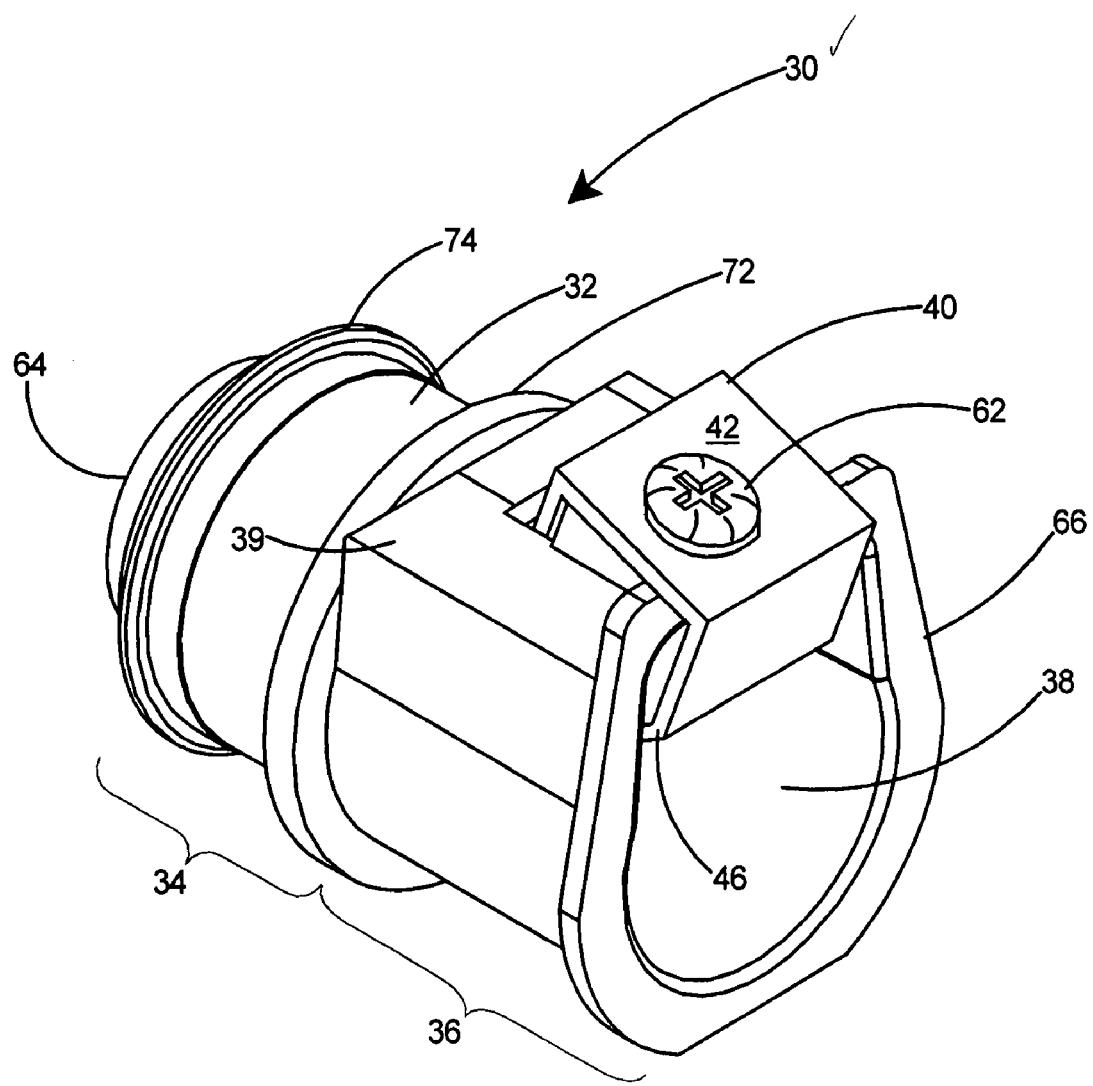
FIG. 1 is a perspective view from the trailing end of an electrical fitting according to the present invention.

| | |
|---|---|
| 30 | electrical fitting |
| 32 | tubular body |
| 34 | leading portion |
| 36 | trailing portion |
| 38 | bore |
| 39 | raised area of tubular body |
| 40 | clip member |
| 42 | base portion |
| 44 | central axis |
| 45 | cylindrical volume |
| 46 | leg |
| 46A | first leg |
| 46B | second leg |
| 47 | cavity |
| 48 | cantilever point |
| 50 | end portion of leg |
| 52 | top portion of leg |
| 54 | intermediate portion of leg |
| 56 | aperture in clip member |
| 58 | aperture in tubular body |
| 60 | opening |
| 62 | fastener |
| 64 | leading end |
| 66 | trailing end |
| 68 | top wall of trailing portion |
| 70 | top wall of leading portion |
| 72 | central flange |
| 74 | end flange of tubular body |
| 76 | thick wall section |
| 78 | partial closure |
| 80 | opening in partial closure |
| 82 | edge |
| 84 | insert |
| 86 | end flange of insert |
| 88 | smooth seat |
| 90 | necked-down nose section |
| 91 | center bore of insert |
| 92 | outer sheath |
| 93 | peak |
| 94 | groove |
| 96 | first cable |
| 98 | second cable |
| 100 | lower end of leg |
| 102 | semicircular notch |
| 104 | blank |
| 106 | bend line |
| 110 | electrical fitting |
| 112 | connector body |
| 114 | leading end of connector body |
| 116 | trailing end of connector body |
| 118 | intermediate flange |
| 120 | leading opening |
| 122 | trailing opening |
| 124 | tandem tang |
| 126 | fastener |
| 128 | open channel |
| 130 | bottom of open channel |
| 132 | bridge |
| 133 | outwardly extending ramp |
| 134 | inclined surface of bridge |
| 136 | aperture in inclined surface |
| 138 | bore |
| 140 | leading tang |

-continued

INDEX TO REFERENCE NUMERALS IN DRAWINGS

| | |
|---|---|
| 142 | trailing tang |
| 144 | common middle section |
| 146 | cable grabbing end |
| 148 | aperture in common middle section |
| 150 | first right angle bend |
| 154 | second right angle bend |
| 158 | bend line |
| 200 | duplex electrical fitting |
| 202 | connector body |
| 204 | leading end of connector body |
| 206 | trailing end of connector body |
| 208 | sidewall |
| 210 | leading opening |
| 212 | trailing opening |
| 214 | open channel |
| 216 | midportion of connector body |
| 217 | cylindrical nose portion |
| 218 | bottom of open channel |
| 220 | bridge |
| 222 | outwardly extending ramp |
| 224 | inclined surface |
| 226 | tandem tang |
| 227 | electrical cable |
| 228 | blank |
| 229 | second bend line |
| 230 | first end leg |
| 232 | second end leg |
| 234 | leading body portion |
| 236 | trailing body portion |
| 238 | flange on trailing body portion |
| 240 | forward nose |
| 242 | leading edge of trailing body portion |
| 244 | aperture |
| 246 | forward view port |
| 248 | trailing edge of leading body portion |
| 250 | skirt |
| 252 | rearward view ports |
| 254 | midsection of leading body portion |
| 256 | forward flange |
| 258 | boss |
| 260 | threaded aperture |
| 262 | fastener |
| 264 | internal wall |
| 266 | pair of openings in wall |
| 268 | cavity in skirt |
| 269 | longitudinal wall |
| 270 | snap ring |
| 272 | fastener |
| 274 | cable axis |
| 278 | groove in cable |
| 280 | electrical leads or wires |
| 282 | electrical panel |
| 284 | alternative attachment arrangement |
| 286 | threaded nose portion |
| 288 | locknut |
| 300 | clip member, second embodiment |
| 302 | base portion |
| 303 | leading end of base portion |
| 304 | trailing end of base portion |
| 305 | leg |
| 306 | first end portion |
| 308 | second end portion |
| 310 | blank |
| 312 | bend line |
| 314 | bend line |
| 316 | bend line |
| 318 | aperture |
| 320 | arcuate end |
| 322 | notch |
| 324 | plane |
| 326 | major leg portion |
| 330 | clip member, third embodiment |
| 332 | bend line |
| 334 | blank |
| 336 | forward lip |
| 340 | clip member, fourth embodiment |
| 342 | leading leg |

-continued

INDEX TO REFERENCE NUMERALS IN DRAWINGS

| | |
|---|---|
| 344 | blank |
| 350 | clip member, fifth embodiment |
| 351 | blank |
| 352 | leading leg |
| 354 | trailing leg |
| 356 | plane of leading leg |
| 357 | plane of trailing leg |
| 358 | bend line |
| 359 | bend line |
| 360 | electrical fitting |
| 361 | central axis of leading opening |
| 362 | electrical cable |
| 363 | fastener |
| 364 | groove in cable |
| 366 | peak |
| 370 | electrical fitting |
| 380 | electrical fitting |
| 400 | electrical fitting, preferred embodiment |
| 402 | connector body |
| 404 | leading body portion |
| 406 | trailing body portion |
| 408 | nose portion of connector body |
| 410 | outlet bore of connector body |
| 412 | trailing end of connector body |
| 414 | leading edge of trailing body portion |
| 416 | midportion of trailing body portion |
| 418 | flange |
| 420 | front portion |
| 422 | view port |
| 424 | sidewalls |
| 426 | open channel |
| 427 | channel bottom |
| 428 | bridge |
| 429 | aperture |
| 430 | inlet bore |
| 432 | longitudinal wall |
| 434 | transverse wall |
| 435 | opening in transverse wall |
| 436 | forward end of inlet bore |
| 438 | inclined surface |
| 440 | ramp |
| 442 | long side of opening |
| 444 | depression |
| 446 | cylindrical seat |
| 448 | skirt on leading body portion |
| 450 | integral boss |
| 452 | shoulder |
| 453 | directional arrows |
| 454 | fastener |
| 456 | fastener |
| 458 | electrical cable |
| 460 | inner arcuate surface |
| 462 | central axis of inlet bore |
| 464 | attachment arrangement |
| 466 | snap ring |
| 468 | leading end of fitting |
| 470 | wire conductor |
| $\theta$ | angle of intermediate portion of leg with respect to central axis |
| $\theta_1$ | bend angle of first leg |
| $\theta_2$ | bend angle of second leg |
| $\theta_3$ | angle between first and second leg |
| $\theta_4$ | angle of tang with respect to the cable axis |
| $\theta_5$ | angle between leg and base portion |
| $\theta_6$ | angle between top and bottom portion of leg |
| $\theta_7$ | angle of end portion with respect to leg |
| $\theta_8$ | angle between leg and base portion |
| $\theta_9$ | angle of arcuate surface with respect to inlet bore axis |

DETAILED DESCRIPTION OF THE INVENTION

With reference to FIG. 1 there is shown a first embodiment of the present invention, an electrical fitting 30 having an improved arrangement for the securing of electrical cables thereto. The electrical fitting 30 includes a continuous tubular body 32 including a leading portion 34, a trailing portion 36, and a bore 38. A raised area 39 extends in one direction from the tubular body 32. Secured externally to the trailing portion 36 of the tubular body 32 is a clip member 40, with the clip member 40 including a base portion 42 at which it is secured to the tubular body 32.

Figure 16:
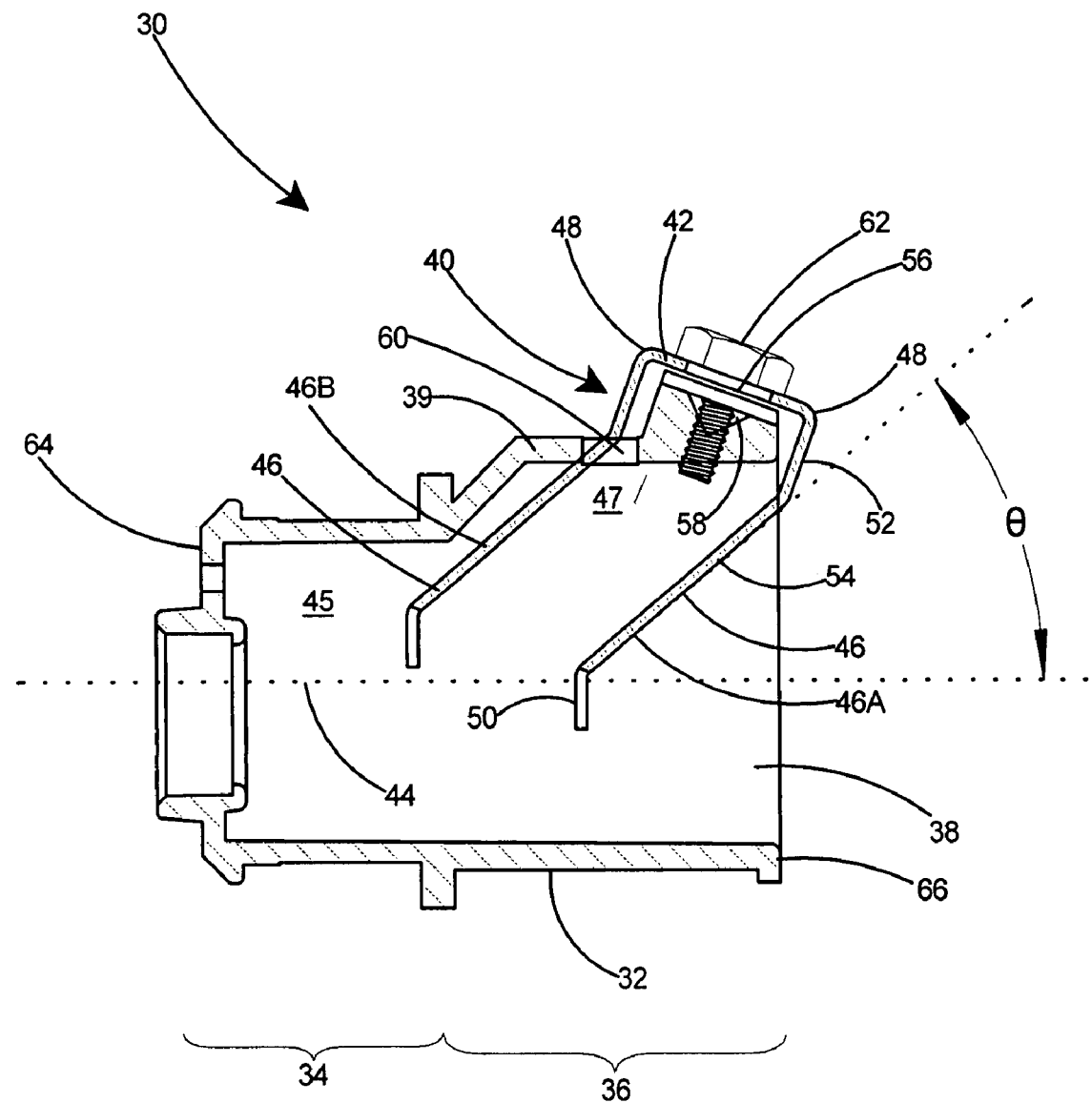
FIG. 16 is a sectional view of the electrical fitting of FIG. 1.

Referring to FIG. 16, the bore 38 of the tubular body 32 includes a central axis 44 defined by the leading portion 34. The central axis 44 of the bore 38 is the axial center of the leading portion 34. A cylindrical volume 45 surrounds the central axis 44 within the leading portion 34. Within the raised area 39 of the trailing portion 36 is a cavity 47. The cavity 47 provides additional volume between the raised area 39 and the central axis 44 and thereby creates a larger volume within the trailing portion 36 than the cylindrical volume 45 of the leading portion 34. At least one leg 46 extends from the base portion 42 of the clip member 40. The leg 46 extends from the raised area 39 of the tubular body 32 into the bore 38. The leg 46 is cantilevered from a point 48 exterior of the tubular body 32, which is the cantilever point 48 where the base portion 42 of the clip member 40 joins the leg 46. The leg 46 extends substantially to the central axis 44 of the tubular body 32. The leg 46 includes an end portion 50 with the end portion 50 being preferably within 30 degrees of perpendicular with respect to the central axis 44 of the tubular body 32. Each leg 46 includes a top portion 52 and an intermediate portion 54. The intermediate portion 54 of each leg 46 is preferably at an angle $\theta$ of between 20 and 60 degrees with respect to the central axis 44 of the bore 38, and, more preferably, at an angle $\theta$ of 40 degrees with respect to the central axis 44 of the bore 38.

Figure 6:
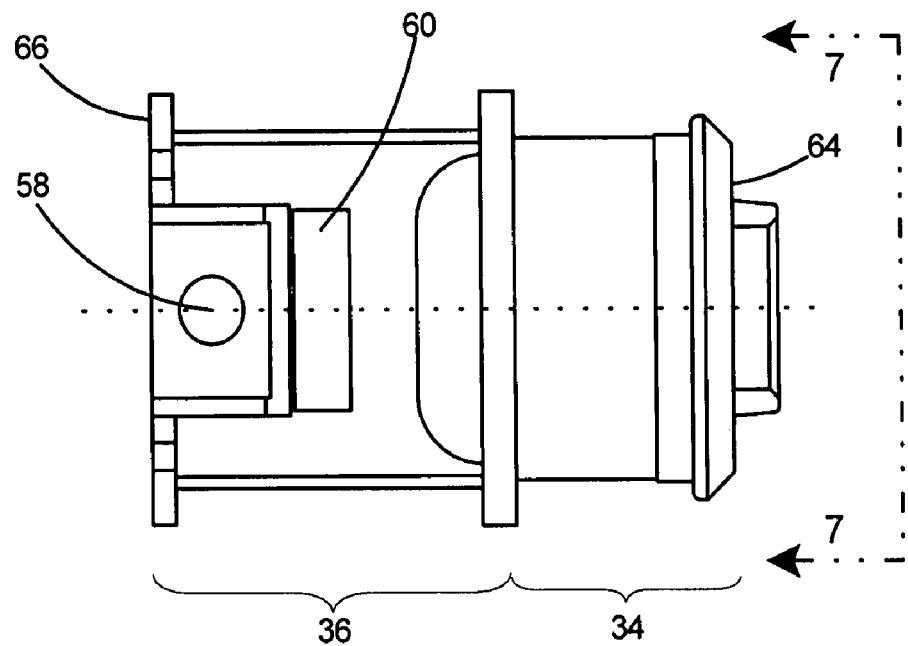
FIG. 6 is a top view of the electrical fitting of FIG. 1.

As shown in FIGS. 11-14, the clip member 40 has two legs 46, including a first leg 46A and a second leg 46B. The base portion 42 of the clip member 40 includes an aperture 56 therein. Additionally, as shown in FIG. 6, the trailing portion 36 of the tubular body 32 includes an aperture 58 therein, which may be a smooth aperture or threaded, and an opening 60 positioned near the aperture 58.

With reference to FIG. 16, the clip member 40 is secured to the tubular body 32 by a fastener 62 secured through the aperture 56 in the clip member 40 into the aperture 58 in the trailing portion 36 of the tubular body 32. The tubular body 32 includes a leading end 64 and a trailing end 66. When the clip member 40 is secured to the tubular body 32, the first leg 46A extends directly into the bore 38 of the tubular body 32 at the trailing end 66. The second leg 46B extends through the opening 60 and into the bore 38 of the tubular body 32. With the clip member 40 secured to the tubular body 32 to form the electrical fitting 30 of the present invention, as shown in FIG. 16, the base portion 42 extends between the first leg 46A and the second leg 46B and the first leg 46A and the second leg 46B extend from the base portion 42 at a substantially constant distance from each other thereby forming parallel legs 46A and 46B. The raised area 39 of the tubular body 32 enables the electrical fitting 30 to accommodate legs 46A and 46B of longer length than comparable prior art fittings, and the greater length increases the flexibility of the legs 46A and 46B thereby allowing them to flex upwards when contacted by a cable inserted therein (not shown) and admit passage of the cable while imparting very little resistance to its forward advance into the bore 38.

Figure 4:
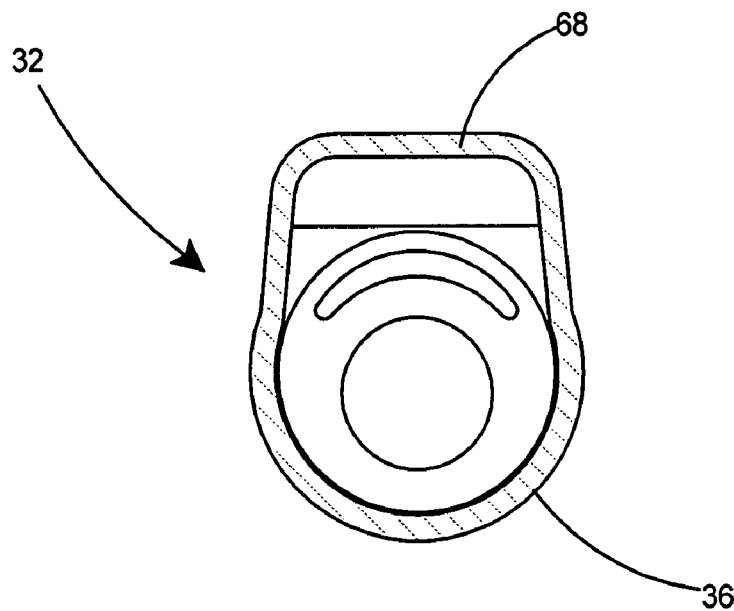
FIG. 4 is a sectional view of the electrical fitting taken along line 4-4 of FIG. 2.
Figure 5:
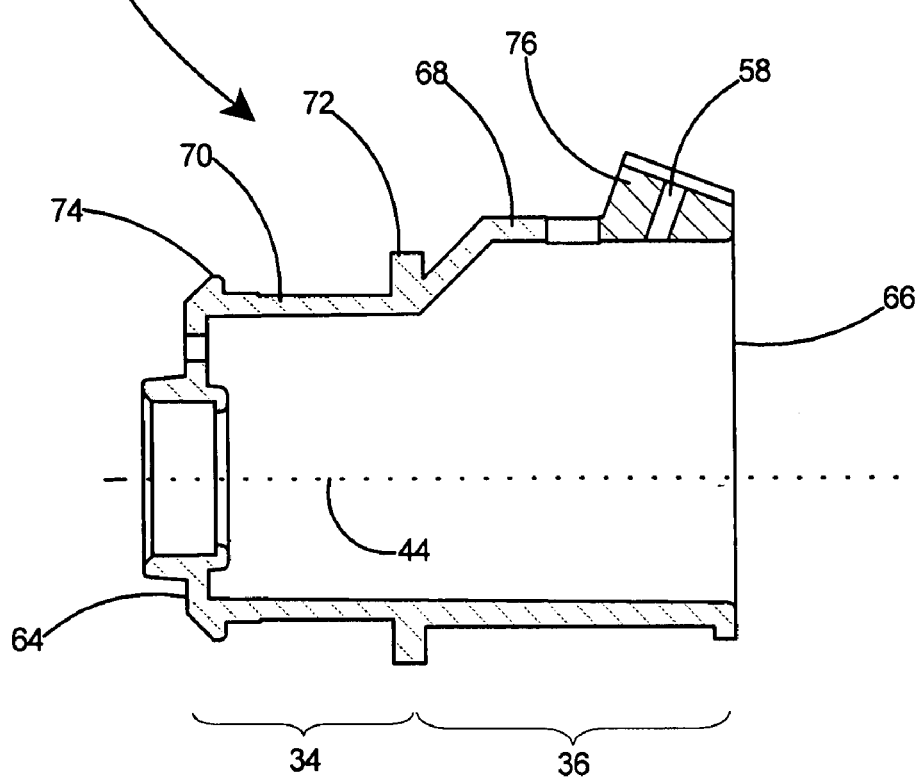
FIG. 5 is a side view of the electrical fitting taken along line 5-5 of FIG. 3.

Referring to FIGS. 4 and 5, the tubular body 32 includes a top wall 68 on the trailing portion 36 and a top wall 70 on the leading portion 34 with the top wall 68 of the trailing portion 36 extending farther from the central axis 44 than the top wall 70 of the leading portion 34. As shown in FIG. 4, the top wall 68 of the trailing portion 36 is substantially flat. The tubular body 32 further includes a central flange 72 between the trailing portion 36 and the leading portion 34 and an end flange 74 on the leading end 64 of the tubular body 32. As shown in FIG. 5, the aperture 58 in the trailing portion 36 of the tubular body 32 is formed in a thick wall section 76.

Figure 7:
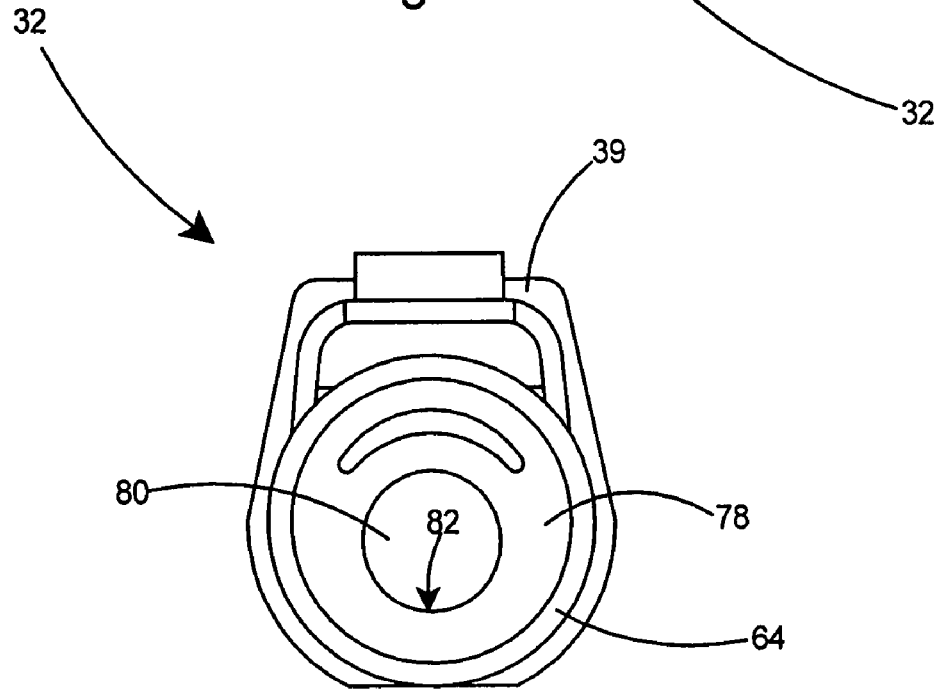
FIG. 7 is a front view of the electrical fitting taken from line 7-7 of FIG. 6.
Figure 11:
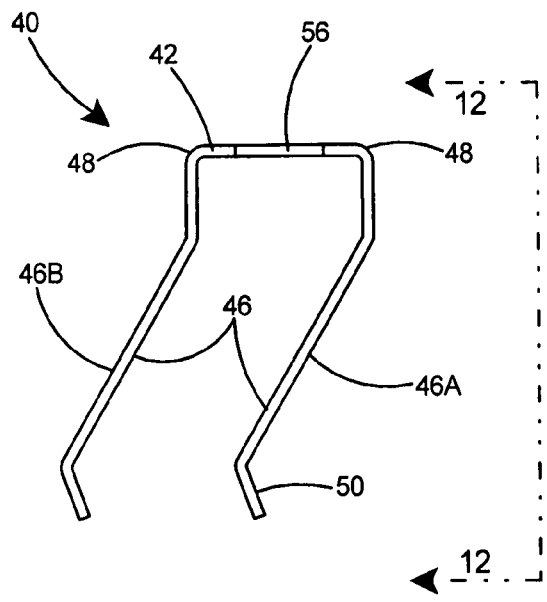
FIG. 11 is a side view of the clip member of FIG. 10.

With reference to FIG. 7, the tubular body 32 further includes a partial closure 78 on the leading end 64. The partial closure 78 includes an opening 80 therein. Edges 82 on the partial closure 78 surround the opening 80.

Figure 2:
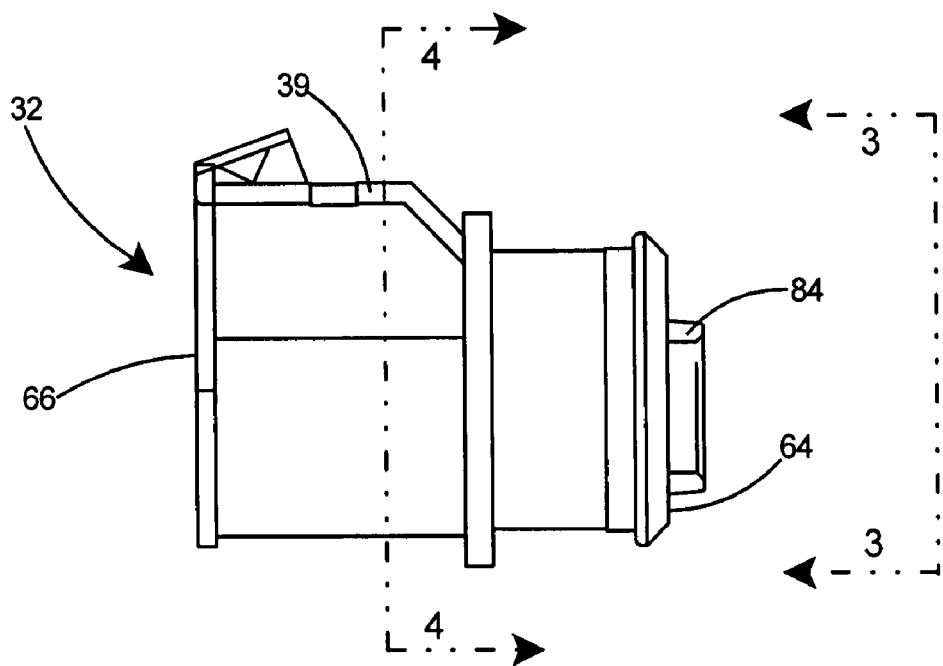
FIG. 2 is a side view of the electrical fitting of FIG. 1.
Figure 3:
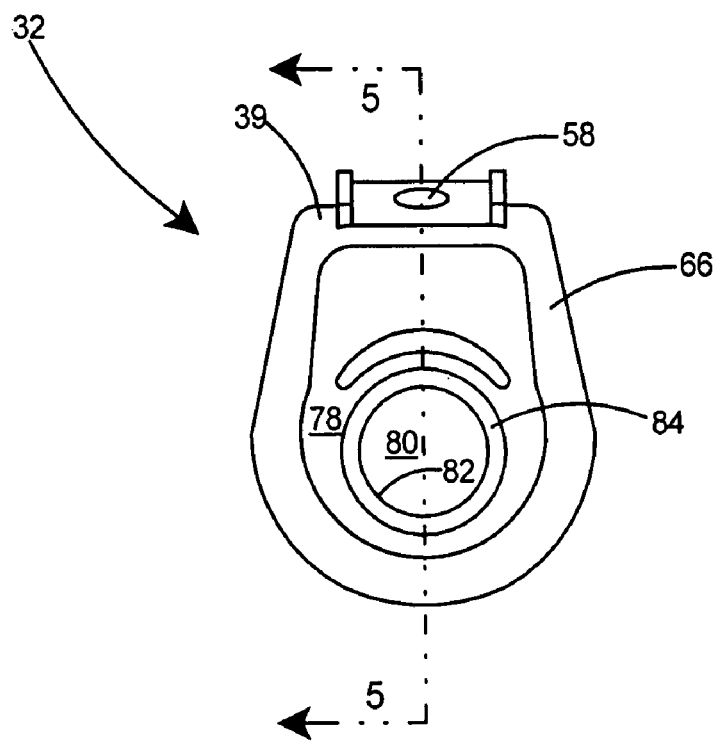
FIG. 3 is a front view of the electrical fitting as taken from line 3-3 of FIG. 2.

A tubular insert 84 which may be used with the electrical fitting of the present invention is depicted in FIGS. 8 and 9. The insert 84 includes an end flange 86, a smooth seat 88, a necked-down nose section 90, and a center bore 91. As shown in FIGS. 2 and 3, the insert 84 may be pressed into the opening 80 of the partial closure 78 on the leading end 64 of the tubular body 32 to substantially cover the edges 82 of the opening 80. The insert 84 acts to protect the outer sheaths of any wiring (not shown) that is later advanced through the opening 80 within the partial closure 78 of the tubular body 32. The insert 84 is preferably molded of plastic.

Figure 19:
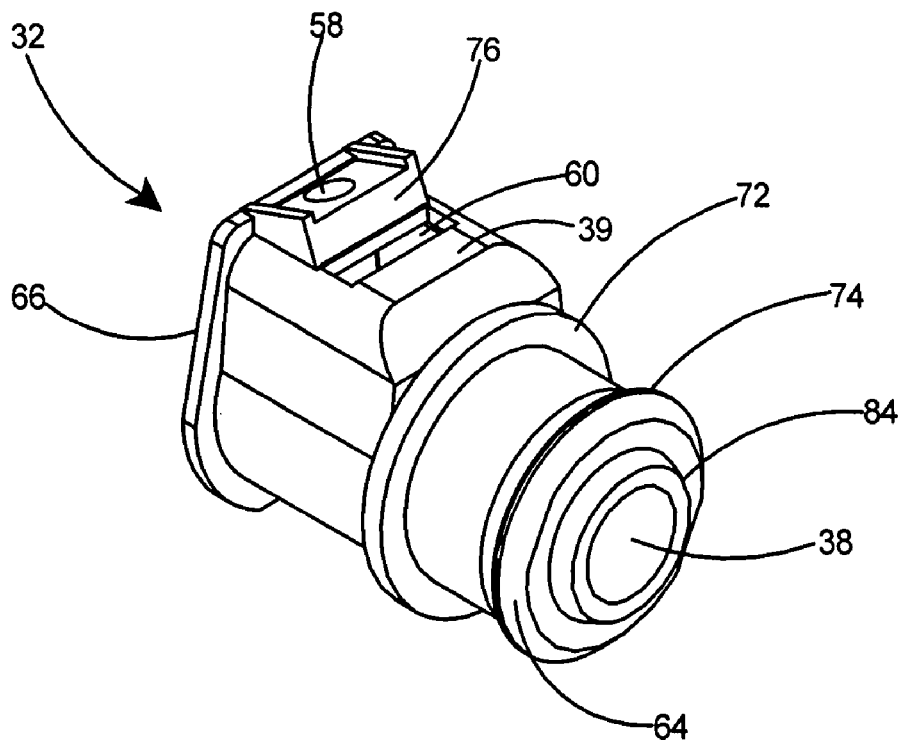
FIG. 19 is a perspective view from the leading end of a tubular body that forms a portion of electrical fitting of FIG. 1.
Figure 20:
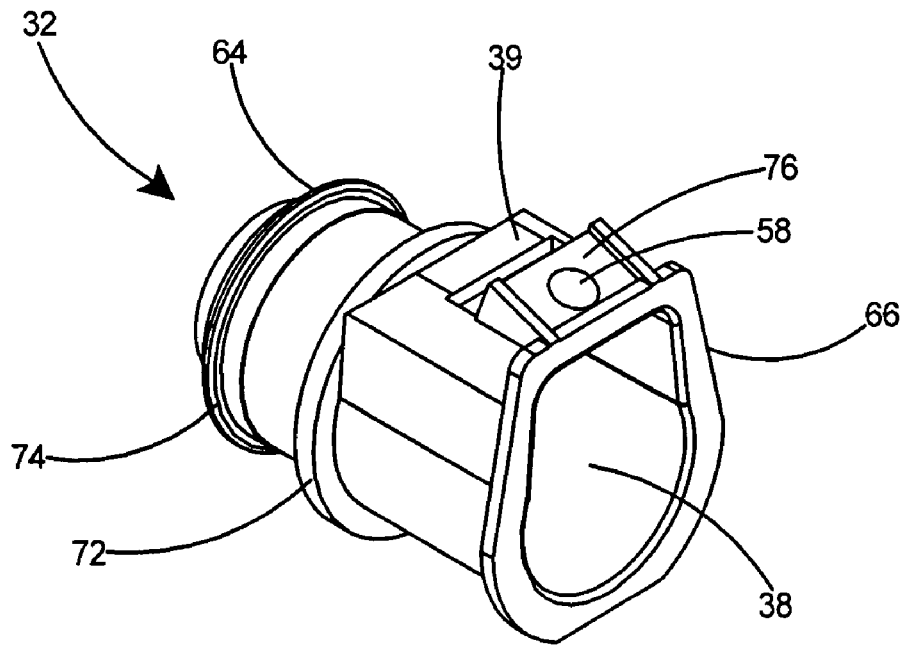
FIG. 20 is a perspective view from the trailing end of the tubular body of FIG. 19.

As shown in FIGS. 19 and 20, the thick wall section 76 including the aperture 58 therein is located at the trailing end 66 of the tubular body 32. As depicted in FIG. 19, the plastic insert 84 is secured in the leading end 64 of the tubular body 32.

The tubular body 32 is constructed of a conductive metal such as steel, zinc, galvanized steel, or aluminum. The tubular body 32 of the present invention is typically formed by die-casting and die-casting alloys are the most preferred material of construction. A most preferred material of construction for the tubular body is Zamak™, a casting alloy comprised mainly of zinc alloyed with aluminum, magnesium, and copper and available from Eastern Alloys, Maybrook, N.Y. By constructing the tubular body of Zamak™ or other appropriate metals, the tubular body will be electrically conductive and provide good continuity throughout the fitting.

Figure 12:
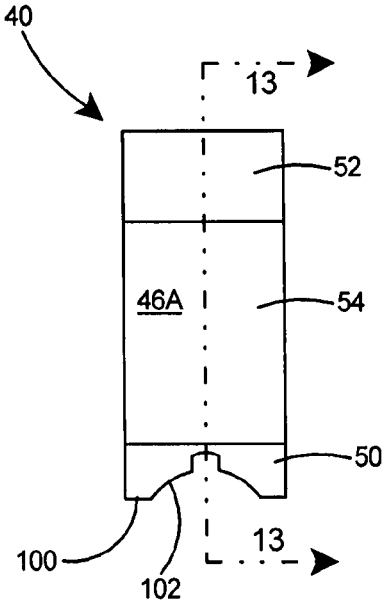
FIG. 12 is an end view of the clip member taken from line 12-12 of FIG. 11.
Figure 13:
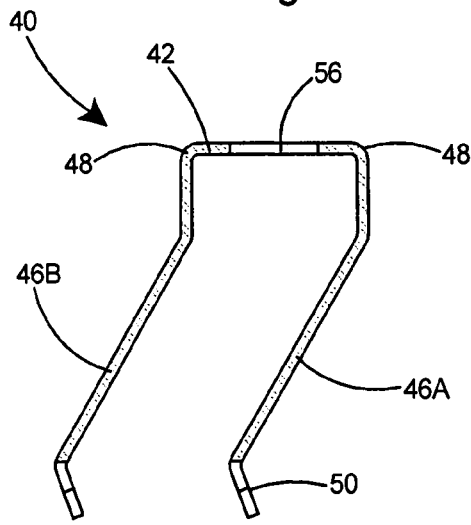
FIG. 13 is a sectional view of the clip member taken along line 13-13 of FIG. 12.
Figure 14:
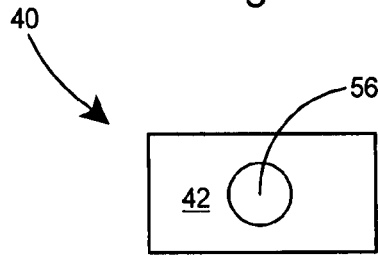
FIG. 14 is a top view of the clip member of FIG. 11.

Referring to FIG. 12, the lower end 100 of each leg 46 of the clip member 40 includes a semicircular notch 102. The semicircular notch 102 is centered on the lower end 100 of the leg 46 and approximates the outer curvature of the portion of a cable (not shown) that the lower end 100 of the leg 46 will seat within. As described above, the leg 46 seats in a groove of the cable (see FIG. 16). Since the electrical fitting of the present invention accommodates two trade sizes of cable, the semicircular notch 102 on the leg 46 includes an arc that provides optimal surface contact to each trade size of cable.

Figure 15:
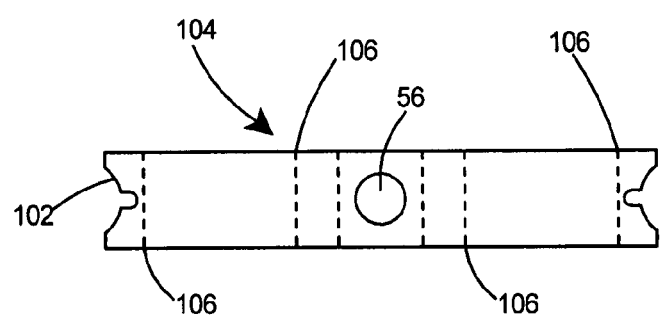
FIG. 15 is a plan view of a blank that is used to form the clip member of FIG. 10.

With reference to FIG. 15, the clip member is preferably formed from a blank 104 of metal. Bend lines 106 are shown on the blank 104 to depict the areas in which the blank 104 will be bent to form the clip member 40 having the shape shown in FIG. 10.

The clip member 40 is preferably constructed of spring steel and is electrically conductive. Constructing the tubular body 32 of zinc alloy and the clip member 40 of spring steel enables the electrical fitting 30 to establish electrical continuity between the metallic-sheathed cable.

Figure 17:
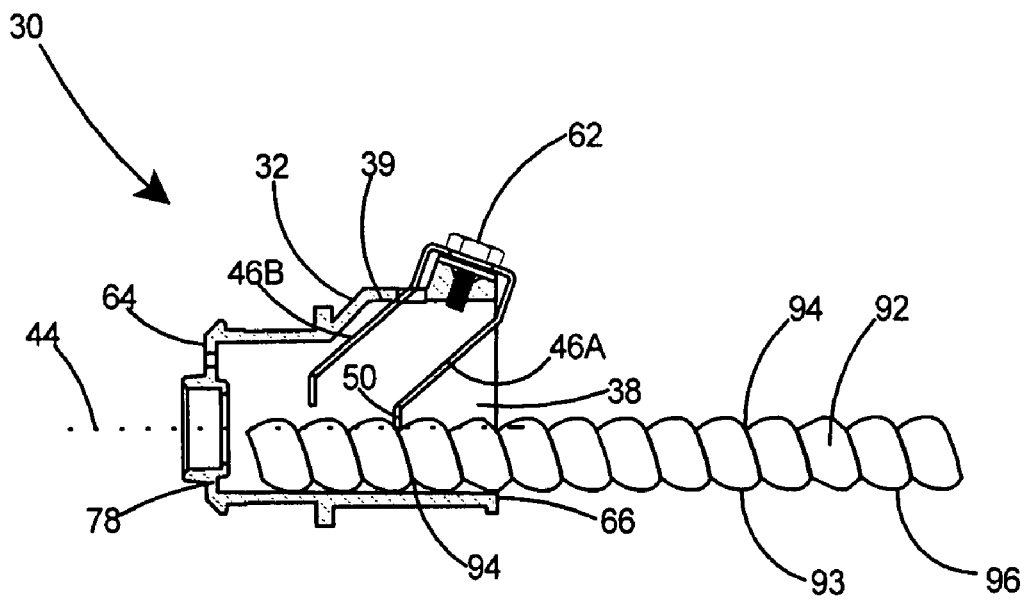
FIG. 17 is a sectional view of the electrical fitting with a metal clad electrical cable secured therein into the fitting.
Figure 18:
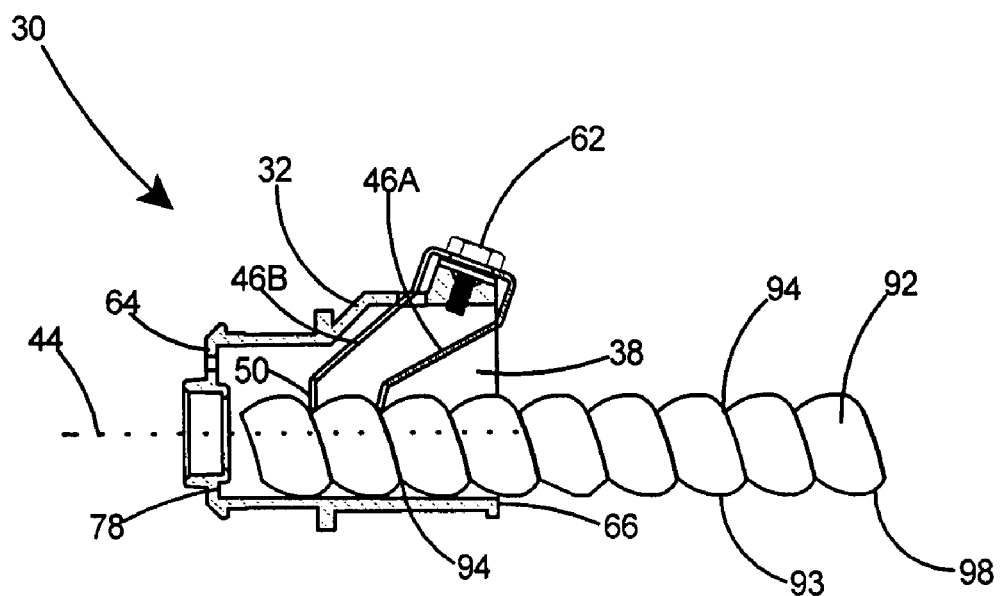
FIG. 18 is a sectional view of the electrical fitting similar to FIG. 17 but with a larger trade size electrical cable secured therein into the fitting.

For operation of the present invention, the reader is directed to the two examples given in FIGS. 17 and 18. As previously mentioned in the objects and advantages section, the electrical fitting 30 of the present invention will typically accommodate two trade sizes of cable, which has several advantages in production and stocking requirements. The electrical fitting is especially useful for securing MC (metal clad) or armored cable to a panel or electrical box. MC or armored cables include a convoluted outer surface 92 consisting of peaks 93 and grooves 94 such as shown in FIG. 17. As the electrical fitting is capable of accepting two trade sizes of cable, the parallel legs 46 are capable of engaging one or more of the grooves 94 of the electrical cable depending on the trade size.

With reference to FIG. 17, a first cable 96 is inserted within the bore 38 of the tubular body 32 and, as a result of the flexibility imparted to the legs 46A and 46B by the length and angle of the legs, is engaged by at least one of the legs 46A of the electrical fitting 30 in one of the grooves 94 of the first cable 96. The legs 46A and 46B have a certain degree of flexibility, have a certain length, and are at an angle that allows them to flex upwards as a cable is inserted into the fitting 30. As the cable 96 is pushed into the fitting 30, the length and angle of the legs 46A and 46B with respect to the central axis 44 impart enhanced flexibility to the legs 46A and 46B and enables the first leg 46A to flex upwards and admit passage of the cable 96 with very slight resistance. Forward insertion of the cable 96 is limited by the partial closure 78 at the leading end 64 of the fitting 30. Once the cable 96 is fully inserted into the fitting 30, as shown in FIG. 17, the cable 96 is securely held by the first leg 46A. As a result of the first leg 46A seating in a groove 94, and the angle of the first leg 46A with respect to the central axis 44, the cable 96 is held very securely and cannot be removed by a backward force placed upon the cable 96. However, the cable 96 can easily be removed by rotating the cable 96 in a counterclockwise direction with respect to the fitting 30 thereby allowing the first leg 46A to ride in the groove until the cable 96 is fully removed from the fitting 30. The electrical fitting 30 of the present invention effectively grasps a cable 96 by the use of a single leg 46A and 46B from one side of the fitting 30, versus prior art connectors (not shown) that employ multiple gripping members from multiple sides of the fitting.

With reference to FIG. 18, an electrical fitting 30 of the same size as that shown in FIG. 17 is capable of accommodating a second cable 98 of a larger trade size. The larger trade size or smaller gauge cable 98 is of a larger diameter than that shown in the previous example. The second cable 98 is inserted within the bore 38 of the tubular body 32 and, as a result of the flexibility imparted to the legs by the length and angle of the legs, is engaged by both legs 46A and 46B of the electrical fitting 30. As the distance between the parallel legs 46A and 46B substantially matches the distance between successive grooves 94 of the electrical cable 98, the two legs 46A and 46B seat in successive grooves 94 of the cable 98. The flexibility of the legs 46A and 46B and the spacing between them enables each leg to find a groove 94 on the cable 98. As the cable 98 is pushed into the fitting 30, the length and angle of the legs 46A and 46B with respect to the central axis 44 impart enhanced flexibility to the legs 46A and 46B and enables both legs 46A and 46B to flex upwards and admit passage of the cable 98 with very slight resistance. Forward insertion of the cable 98 is again limited by the partial closure 78 at the leading end of the fitting 30. Once the cable 98 is fully inserted into the fitting 30, as shown in FIG. 18, the cable 98 is securely held by both legs 46A and 46B. As a result of the legs 46A and 46B seating in the grooves 94, and the angle of the legs 46A and 46B with respect to the central axis 44, the cable 98 is held very securely and cannot be removed by a backward force applied thereto. However, similar to the previous example, the cable 98 can easily be removed by rotating the cable 98 in a counterclockwise direction with respect to the trailing end 66 of the fitting 30 thereby allowing the legs 46A and 46B to ride or track in the grooves 94 as the cable 98 is rotated until the cable 98 is fully removed from the fitting 30. As compared to prior art fittings, the clip member 40 of the present invention is thicker and more stable, and the legs 46A and 46B are longer so that the electrical fitting 30 of the present invention will accommodate two sizes of cable. The length of the legs 46A and 46B ensures that they are cantilevered over a longer distance than the analogous gripping members of prior art connectors.

The leading end of the electrical fitting can be secured to a panel (not shown) by an attachment arrangement such as the spring steel adapter (14) disclosed in U.S. Pat. No. 6,335,488 or the spring steel adapter (20) disclosed in U.S. Pat. No. 5,266,050, commonly referred to as snap fittings, both of which patents their entireties are incorporated herein by reference.

Alternatively, the attachment arrangement may include threads on the leading portion of the tubular body and a nut (not shown) for engaging the threads such as the standard lock nut (70) disclosed in U.S. Pat. No. 6,335,488, the entirety of which is incorporated herein by reference.

Figure 21:
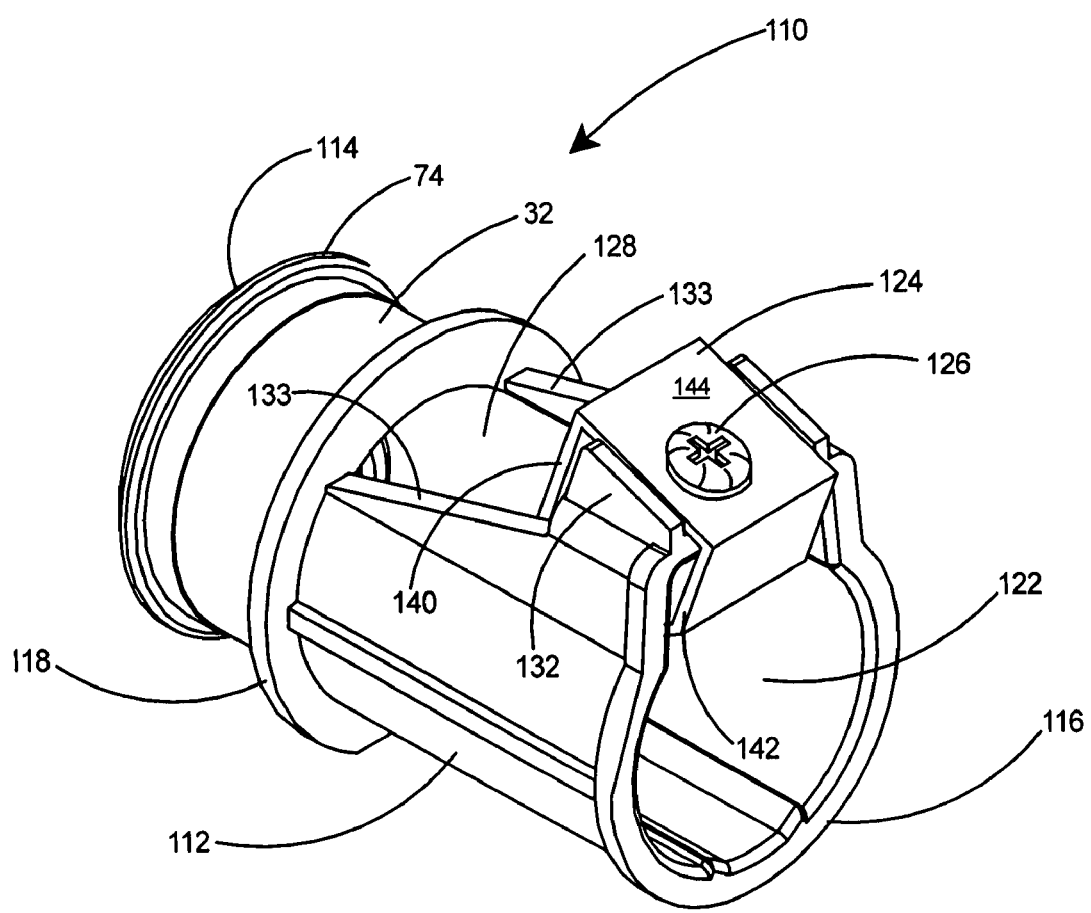
FIG. 21 is a perspective view from the trailing end of an electrical fitting for accommodating a single electrical cable according to the present invention.
Figure 22:
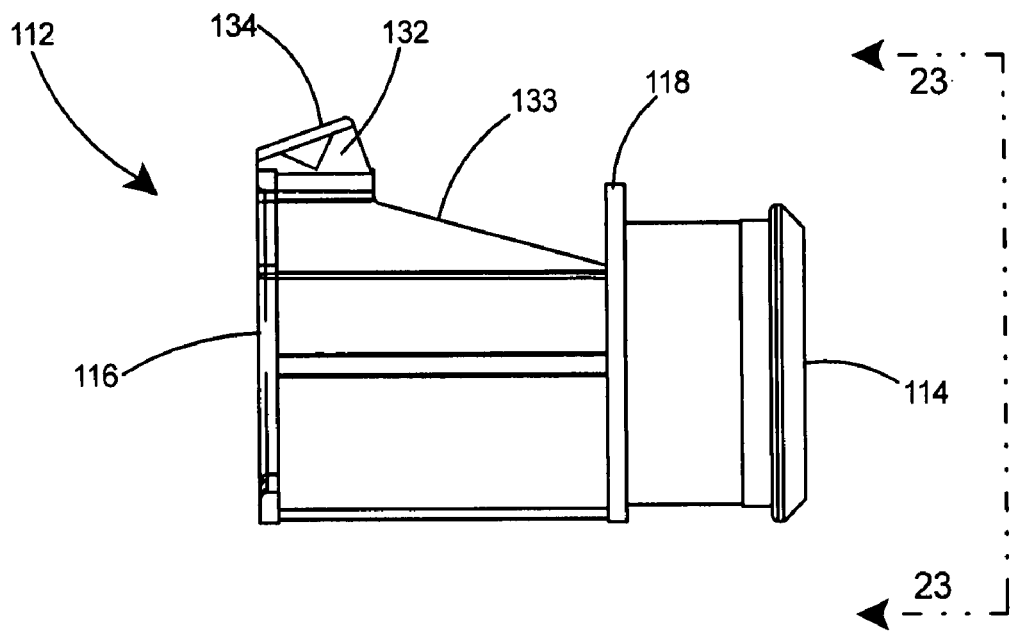
FIG. 22 is a side view of the connector body portion of the electrical fitting of FIG. 21.
Figure 23:
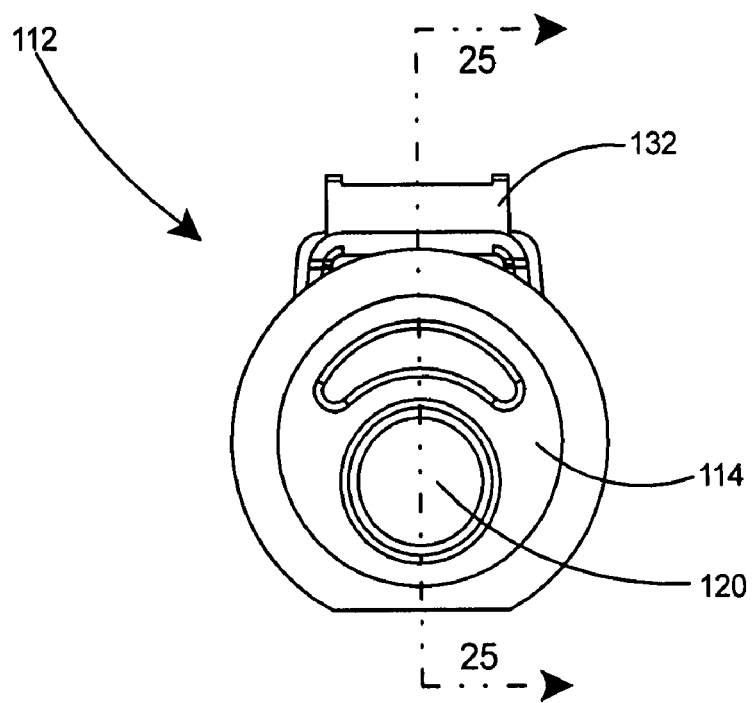
FIG. 23 is a front view of the connector body as taken from line 23-23 of FIG. 22.

Referring to FIG. 21, there is shown an electrical fitting 110 for connecting a single electrical cable to a panel (not shown). The electrical fitting 110 includes a connector body 112 including a leading end 114 and a trailing end 116 separated by an intermediate flange 118. The connector body 112 includes a leading opening 120 (see FIG. 23) at the leading end 114 and a trailing opening 122 at the trailing end 116. The intermediate flange 118 extends transversely beyond the connector body 112 by an amount sufficient to prevent the fitting from going into an electrical box outlet hole (not shown) when the leading end 114 of the connector body 112 is inserted therein. The electrical fitting 110 includes a tandem tang 124 is secured thereto by a fastener 126.

The leading end 114 of the electrical fitting 110 can be secured to a panel (not shown) by an attachment arrangement such as the aforementioned spring steel adapters disclosed in U.S. Pat. No. 6,335,488 or U.S. Pat. No. 5,266,050.

Figure 24:
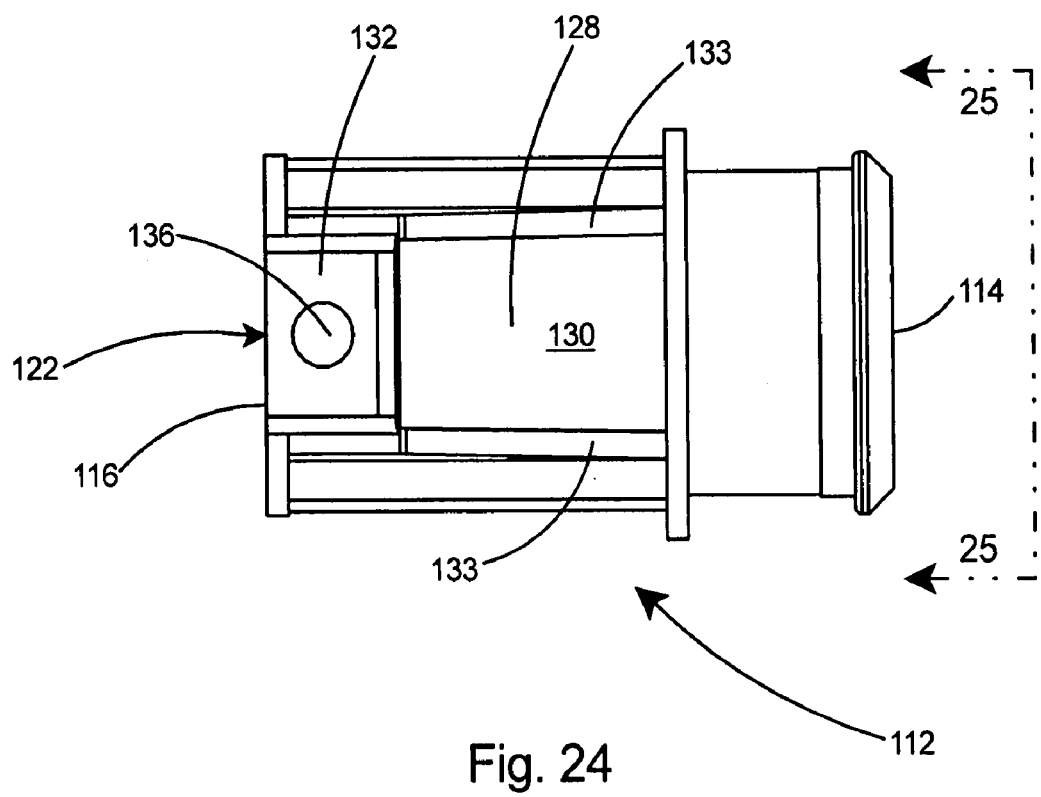
FIG. 24 is a top view of the connector body of FIG. 22.
Figure 25:
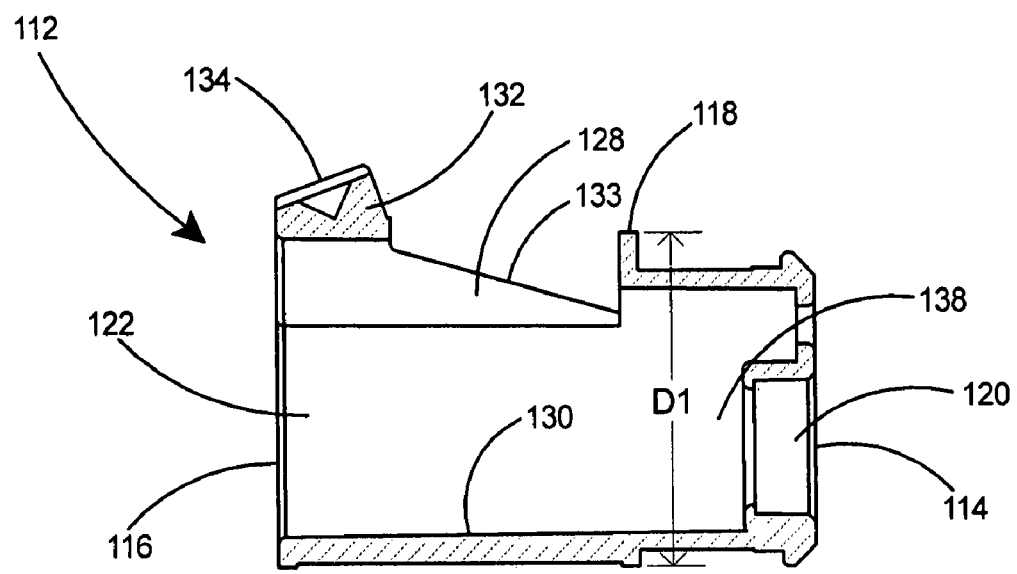
FIG. 25 is a sectional view of the connector body of FIG. 21.

With reference to FIGS. 24 and 25, the trailing end 116 of the connector body 112 includes an open channel 128 that extends from the trailing opening 122 to the flange 118. The open channel 128 includes a bottom 130 therein. The connector body 112 further includes a bridge 132 adjacent the trailing opening 122. Two outwardly extending ramps 133 extend from the part of the open channel 128 adjacent the flange 118 outwardly and rearwardly to provide the support for bridge 132. Adjacent the trailing end opening 122 bridge 132 extends transversely at the top of the outermost part of the ramp 133 to bridge the open channel 128. The bridge 132 bridges the open channel 128 and extends transversely beyond the outer dimension D1 of the intermediate flange 118. The bridge 132 includes an inclined surface 134 and an aperture 136 therein. The connector body 112 also includes a bore 138 extending from the flange 118 to the leading opening 120.

Figure 34:
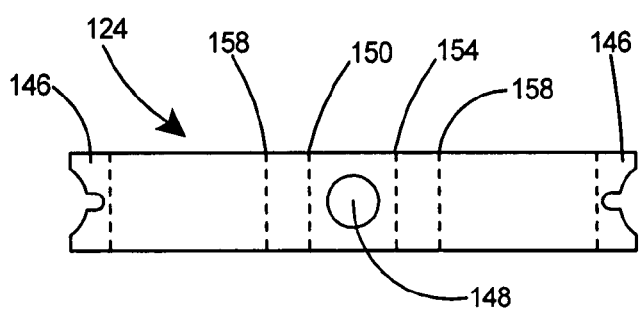
FIG. 34 is a plan view of a blank that is used to form the tandem tang of FIG. 30.

Referring to FIGS. 30-34, the tandem tang 124 includes a leading tang 140, a trailing tang 142, and a common middle section 144. The leading tang 140 and trailing tang 142 each include a cable grabbing end 146. An aperture 148 is provided in the common middle section 144 of the tandem tang 124 for receiving a fastener (see FIG. 21) therein for securing the tandem tang 124 to the connector body 112. The common middle section 144 of the tandem tang 124 is bent at one end at a first right angle 150 to form the leading tang 140 and at the opposite end at a second right angle 154 to the trailing tang 142. The leading tang 140 and the trailing tang 142 each include a bend line 158 as shown in FIG. 34.

Figure 26:
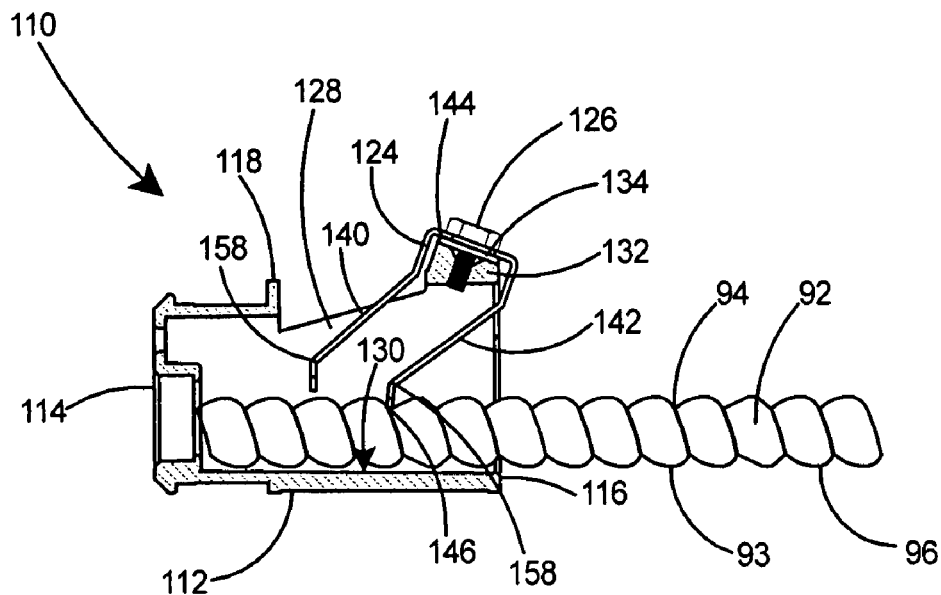
FIG. 26 is a sectional view of the electrical fitting of FIG. 21 with a metal clad electrical cable secured therein into the fitting.
Figure 27:
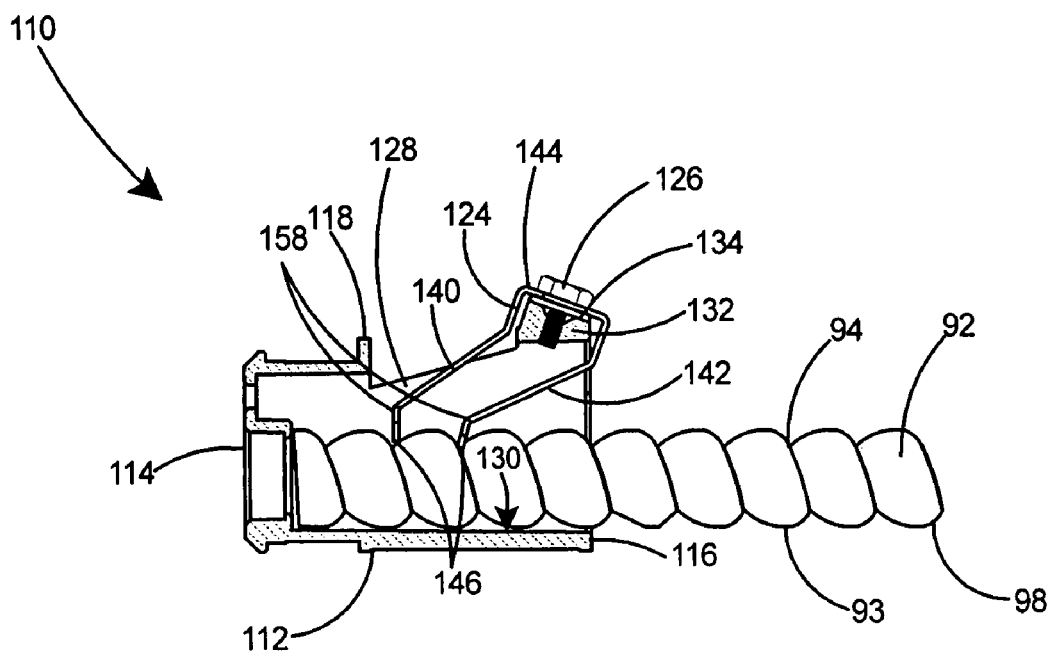
FIG. 27 is a sectional view of the electrical fitting of FIG. 21 but with a larger trade size electrical cable secured therein into the fitting.
Figure 28:
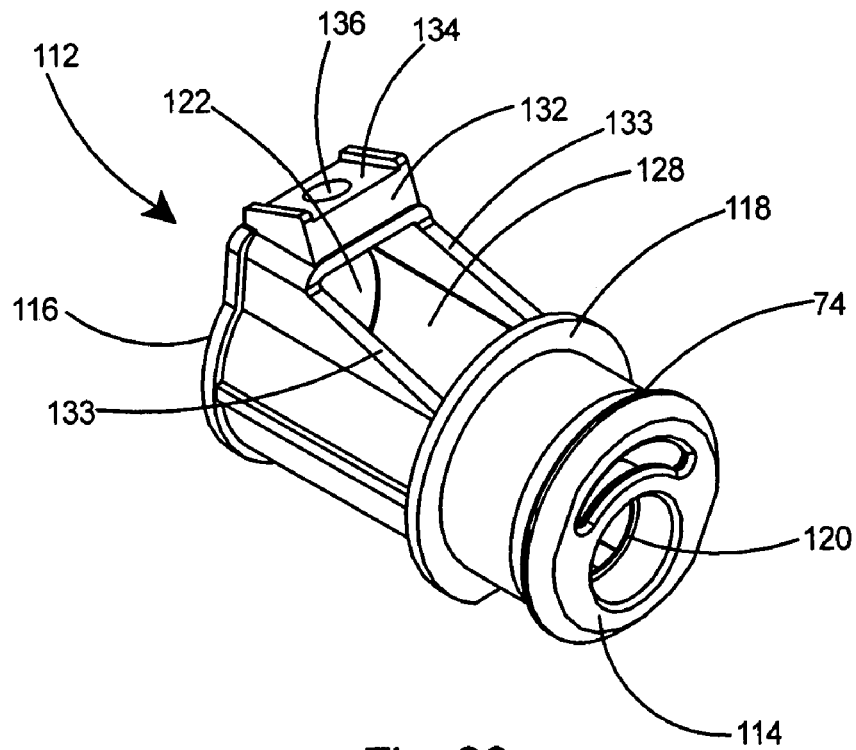
FIG. 28 is a perspective view from the leading end of a connector body that forms a portion of electrical fitting of FIG. 21.
Figure 29:
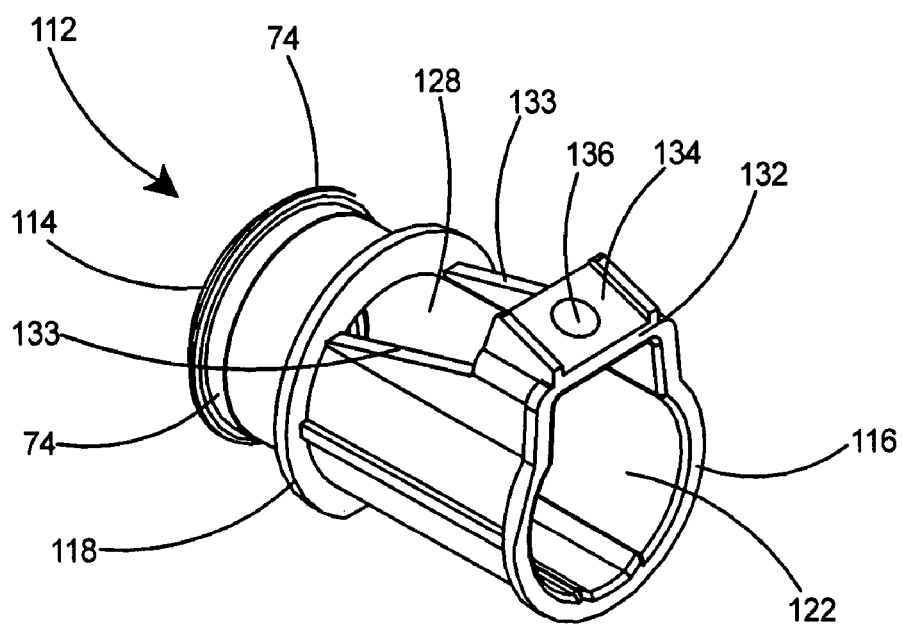
FIG. 29 is a perspective view from the trailing end of the connector body of FIG. 28.
Figure 30:
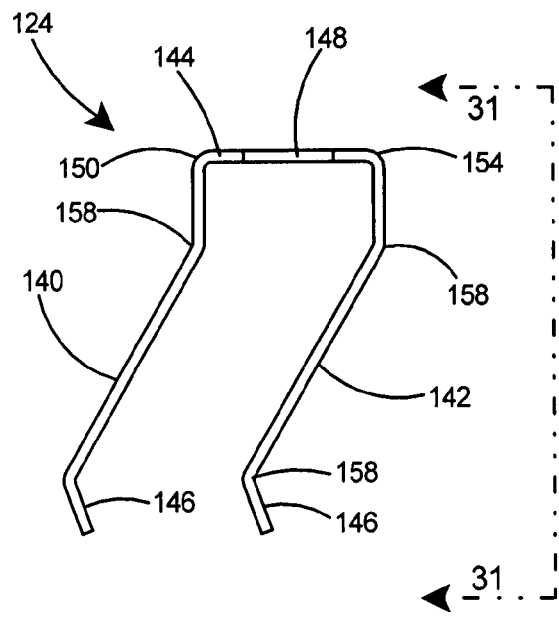
FIG. 30 is a side view of a tandem tang that forms a portion of the electrical fitting of FIG. 21.
Figure 31:
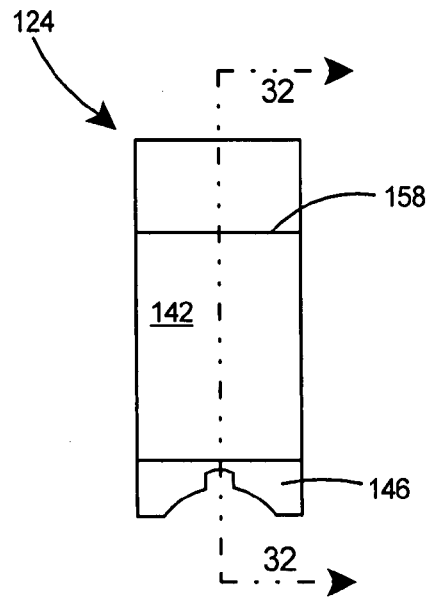
FIG. 31 is an end view of the tandem tang taken from line 31-31 of FIG. 30.
Figure 32:
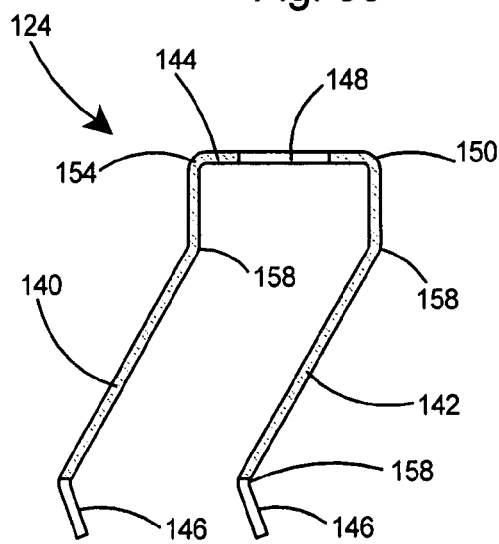
FIG. 32 is a sectional view of the tandem tang taken along line 32-32 of FIG. 31.
Figure 33:
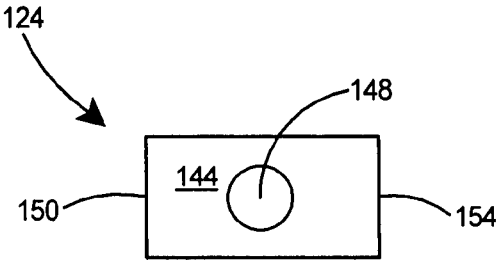
FIG. 33 is a top view of the tandem tang of FIG. 30.

With reference to FIGS. 26-27, the bend lines 158 on both the leading tang 140 and the trailing tang 142 direct the cable grabbing end 146 towards the cable 92 thereby holding the cable against the bottom 130 of the open channel 128. The inclined surface 134 of the bridge 132 is included on the connector body 112 for receiving and attaching the common middle section 144 of the tandem tang 124. The leading tang 140 and trailing tang 142 each include a cable grabbing end 146 for contacting and holding a cable 96 against the bottom 130 of the open channel 128.

Figure 35:
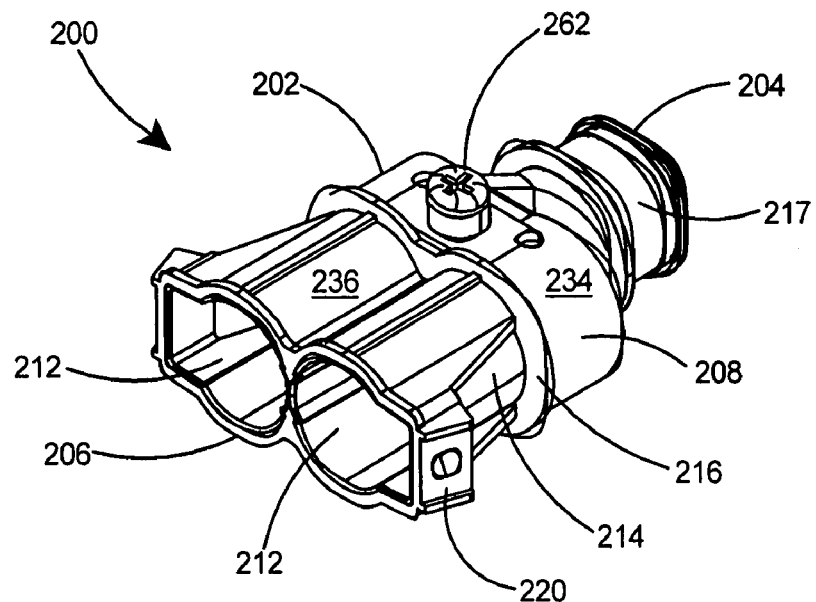
FIG. 35 is a perspective view from the trailing end of a connector body portion of a duplex electrical fitting according to the present invention.
Figure 36:
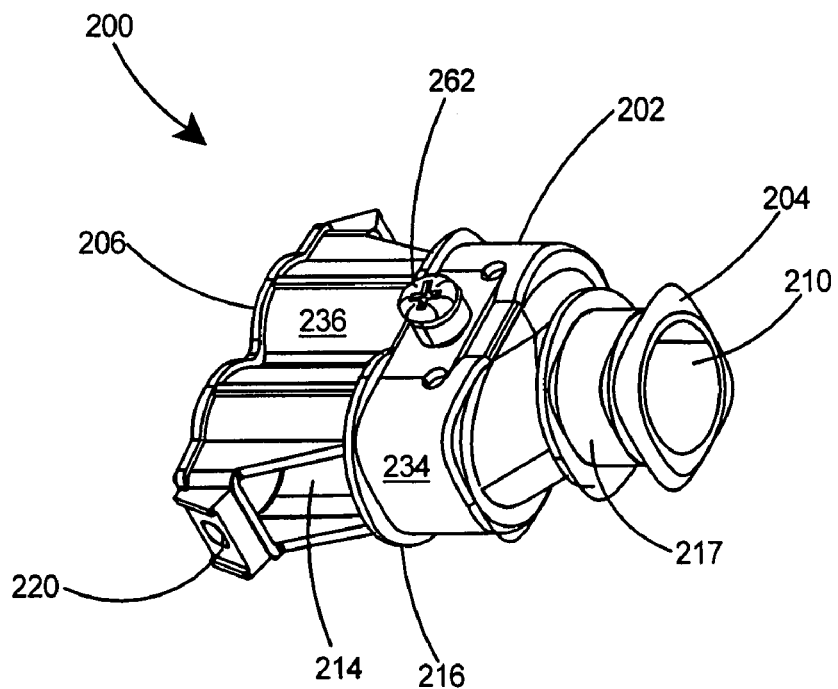
FIG. 36 is a perspective view from the leading end of the connector body of FIG. 35.

Referring to FIGS. 35 and 36, there is shown a duplex electrical fitting 200 for connecting two electrical cables to a panel (not shown). The duplex electrical fitting 200 includes a connector body 202 including a leading end 204, a trailing end 206, and a sidewall 208. The connector body 202 includes a leading opening 210 in the leading end 204 and two trailing openings 212 in the trailing end 206. The connector body 202 further includes a midportion 216 intermediate the leading end 204 and the trailing end 206. The connector body 202 includes two open channels 214 with each open channel 214 extending through the sidewall 208 into one of the trailing openings 212 at the trailing end 206 of the connector body 202. The connector body 202 includes a midportion 216 approximately midway between the leading end 204 and trailing end 206. The leading end 204 of the connector body 202 of the duplex electrical connector 200 includes a cylindrical nose portion 217.

Figure 42:
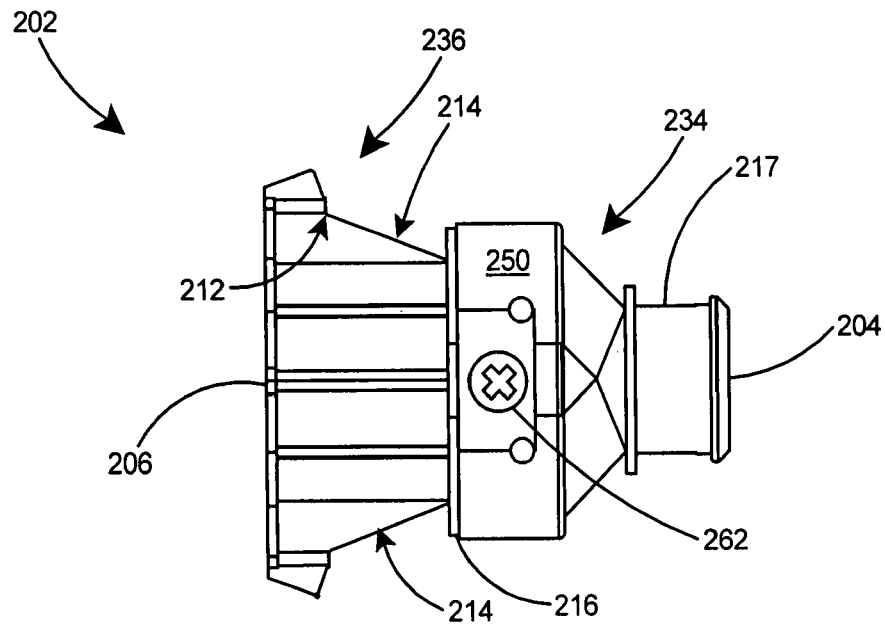
FIG. 42 is a top view of the connector body formed by the joining of the leading and trailing body portions of FIG. 41.
Figure 46:
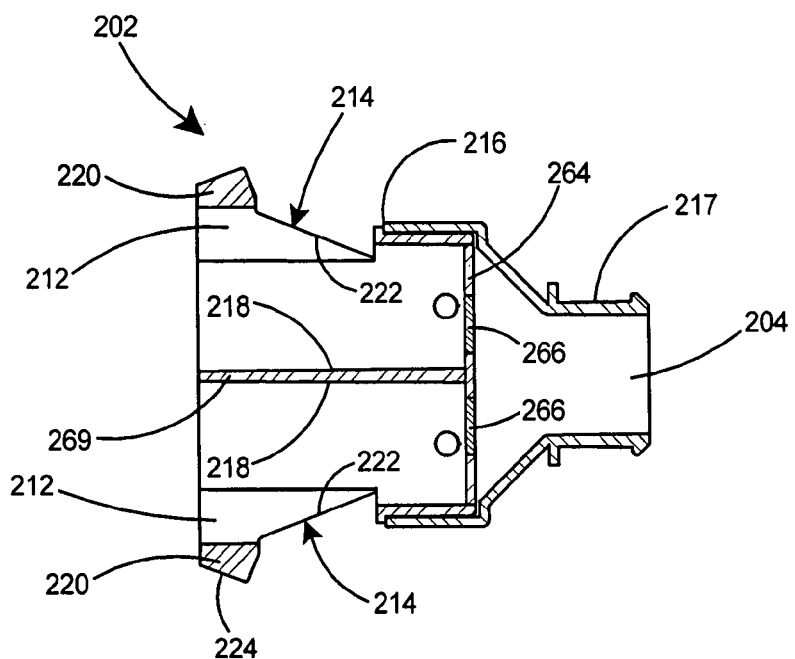
FIG. 46 is a sectional view of the connector body formed by the joining of the leading and trailing body portions of FIG. 43.

As shown in FIG. 42, the open channels 214 extend from the trailing opening 212 to the midportion 216 of the connector body 202. With reference to FIG. 46, the open channels 214 include a bottom 218 therein within the connector body 202. A bridge 220 adjacent each of the trailing openings 212 bridges the open channels 214. Two ramps 222 extend outwardly and rearwardly from the midportion 216 of the connector body 202 to provide support for the bridge 220. The bridge 220 includes an inclined surface 224.

Figure 48:
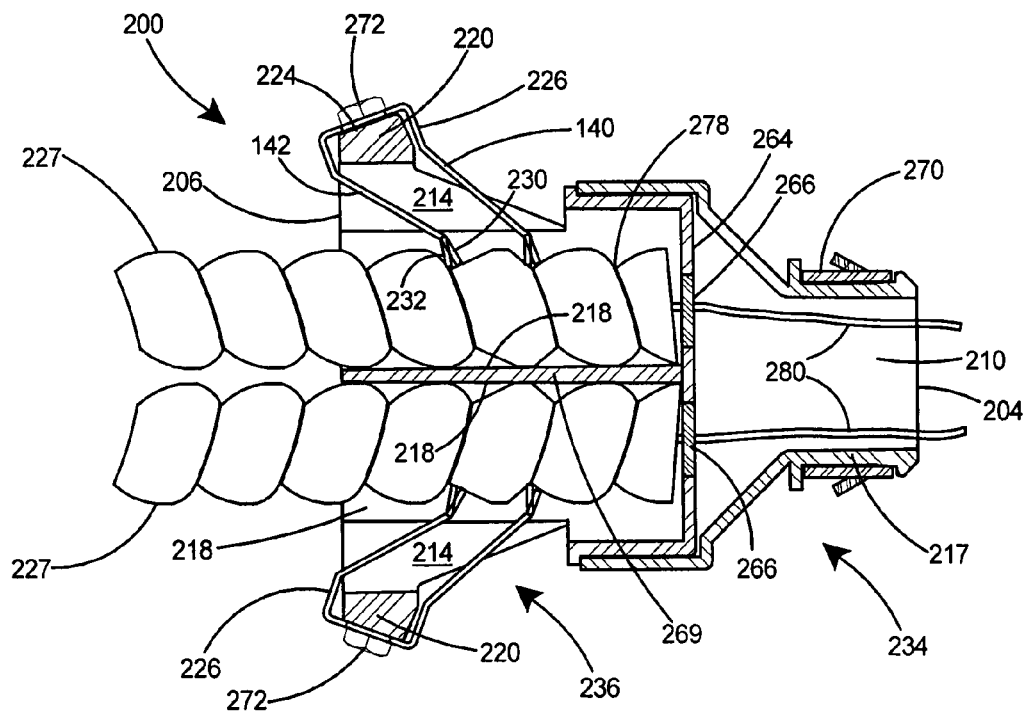
FIG. 48 is a sectional view of the electrical fitting of the present invention including two cables inserted therein.

As shown in FIG. 48, the duplex electrical fitting 200 of the present invention includes two tandem tangs 226 for securing electrical cables 227 to the trailing end 206 of the fitting.

Figure 50:
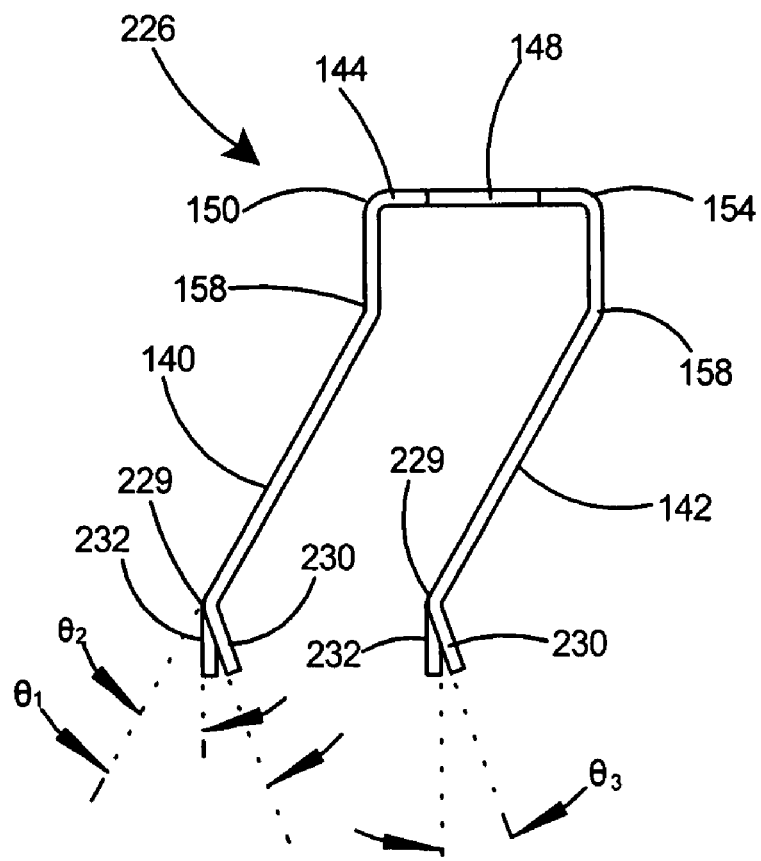
FIG. 50 is a side view of a tandem tang that forms a portion of the duplex electrical fitting of FIG. 49.
Figure 51:
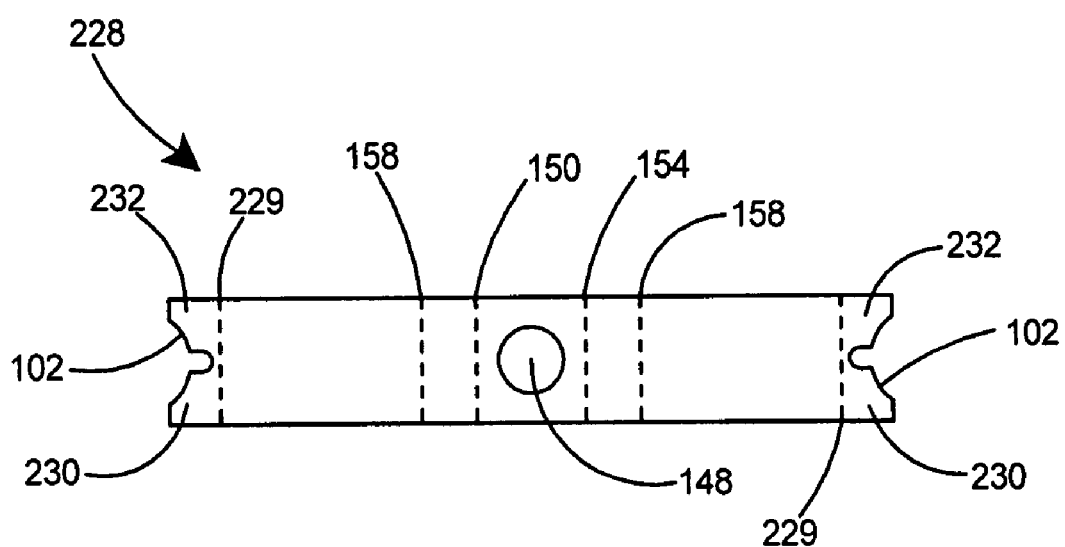
FIG. 51 is a plan view of a blank that is used to form the tandem tang of FIG. 50.

With reference to FIGS. 50 and 51, the tandem tang 226 is analogous to the tandem tang previously presented herein (see FIGS. 30-34) and includes a common middle section 144 and a leading tang 140 and trailing tang 142. However, in this embodiment of the tandem tang 226, each end of the blank 228 includes a bend line 158 and a second bend line 229. The blank 228 will be bent at the bend lines 158 to form the leading tang 140 and trailing tang 142. Preferably, the blank 228 is bent at 30 degrees at bend lines 158. The blank 228 will be also be bent at the second bend lines 229 to form a first end leg 230 and a second end leg 232. The bottom half of the blank 228 will be bent by angle $\theta_1$ at the bottom halves of second bend lines 229 to form first end legs 230 on each of the leading tang 140 and trailing tang 142 and the top half of the blank 228 will be bent by angle $\theta_2$ at each of the top halves of second bend lines 229 to form second end legs 232 on each of the leading tang 140 and trailing tang 142. Thus both the leading tang 140 and trailing tang 142 will have end legs 230 and 232, which are preferably directed $\theta_3$ degrees apart. Most preferably, first end legs 230 are bent at an angle $\theta_1$ of 50 degrees with respect to the tangs 140 and 142, second end legs 230 are bent at an angle $\theta_2$ of 30 degrees with respect to the tangs 140 and 142, and the first end leg 230 and second end leg 232 will therefore be at an angle $\theta_3$ of 20 degrees apart.

Figure 37:
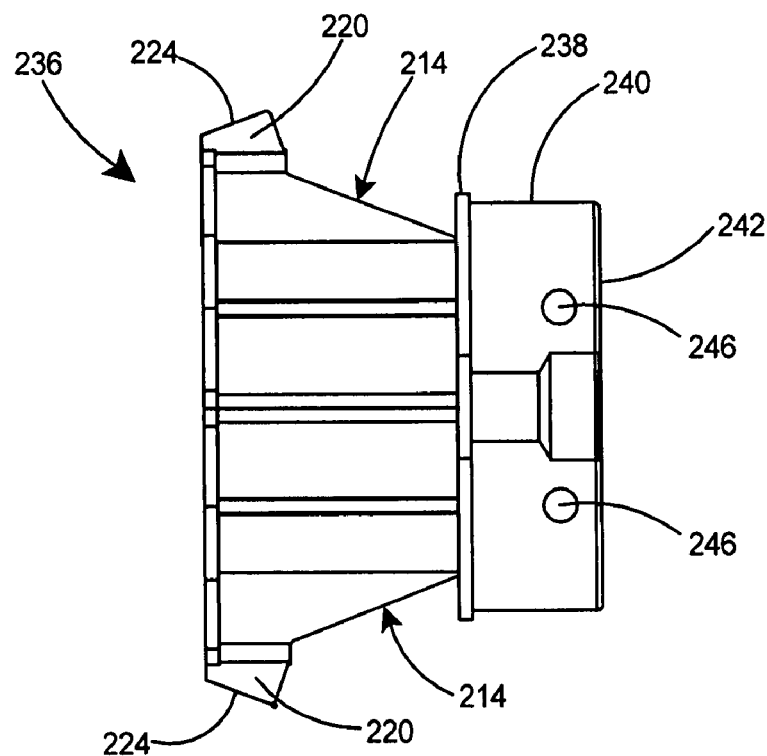
FIG. 37 is a top view of a trailing body portion of the connector body of FIG. 35.
Figure 38:
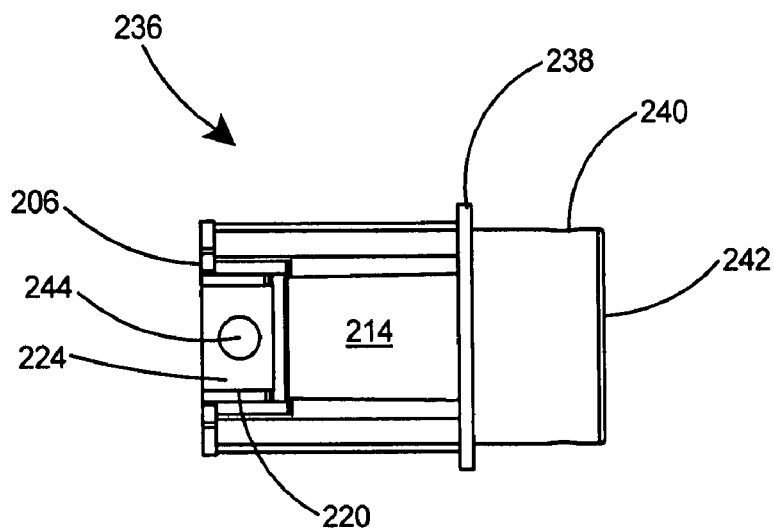
FIG. 38 is a side view of the trailing body portion of FIG. 37.

Referring to FIGS. 35-36, the connector body 202 of the duplex electrical connector 200 includes a leading body portion 234 and a trailing body portion 236. As shown in FIGS. 37 and 38, the trailing body portion 236 includes the open channels 214, the bridges 220 spanning each of the open channels 214, and the inclined surface 224 on the bridge 220. The trailing body portion 236 further includes a flange 238, a forward nose 240, a leading edge 242, and an aperture 244 in the inclined surface 224. Two forward view ports 246 are provided on the forward nose 240.

Figure 39:
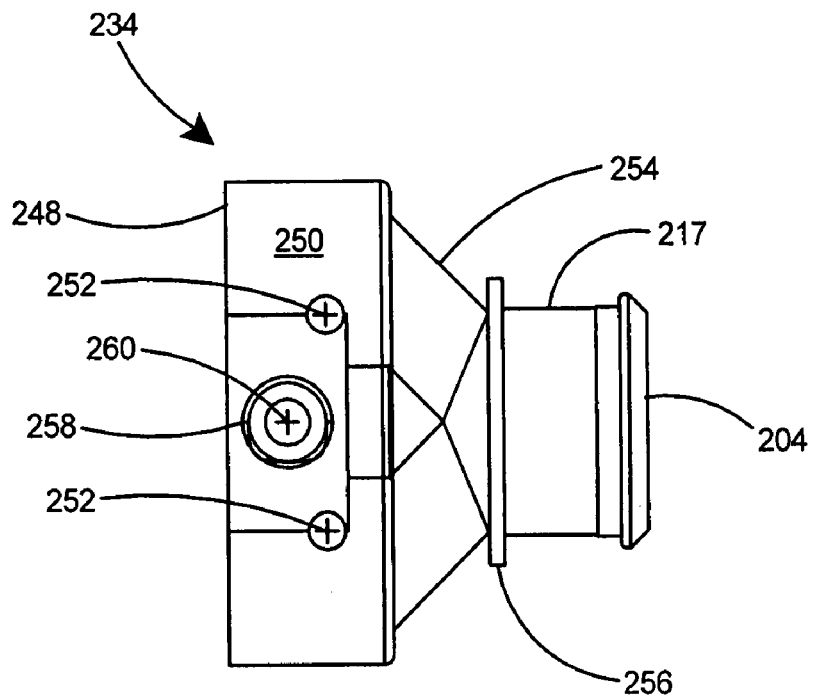
FIG. 39 is a top view of a leading body portion of the connector body of FIG. 35.
Figure 40:
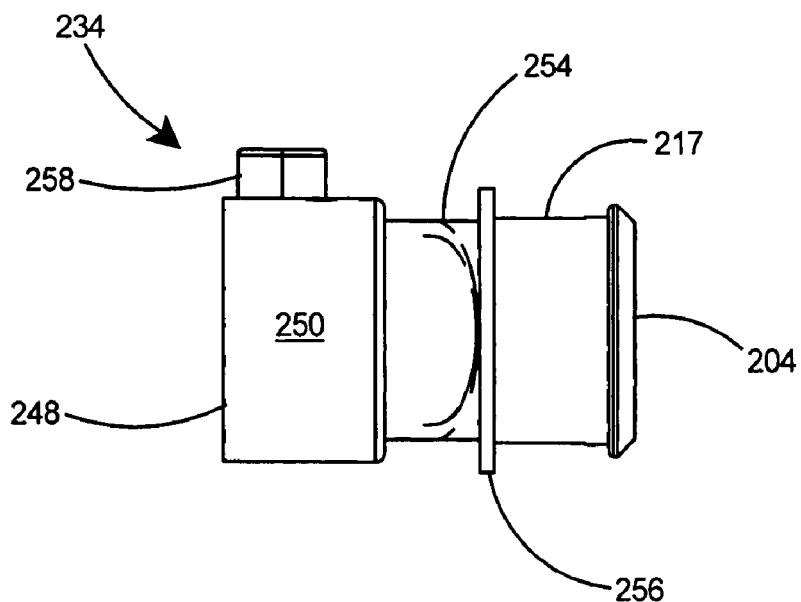
FIG. 40 is a side view of the leading body portion of FIG. 39.

With reference to FIGS. 39-40, the leading body portion 234 includes a trailing edge 248, a skirt 250, two rearward view ports 252, and a midsection 254 that narrows down to meet a forward flange 256 which in turn joins the cylindrical nose portion 217 of the connector body. The leading body portion 234 further includes a boss 258 extending from the skirt 250 that includes a threaded aperture 260.

Figure 41:
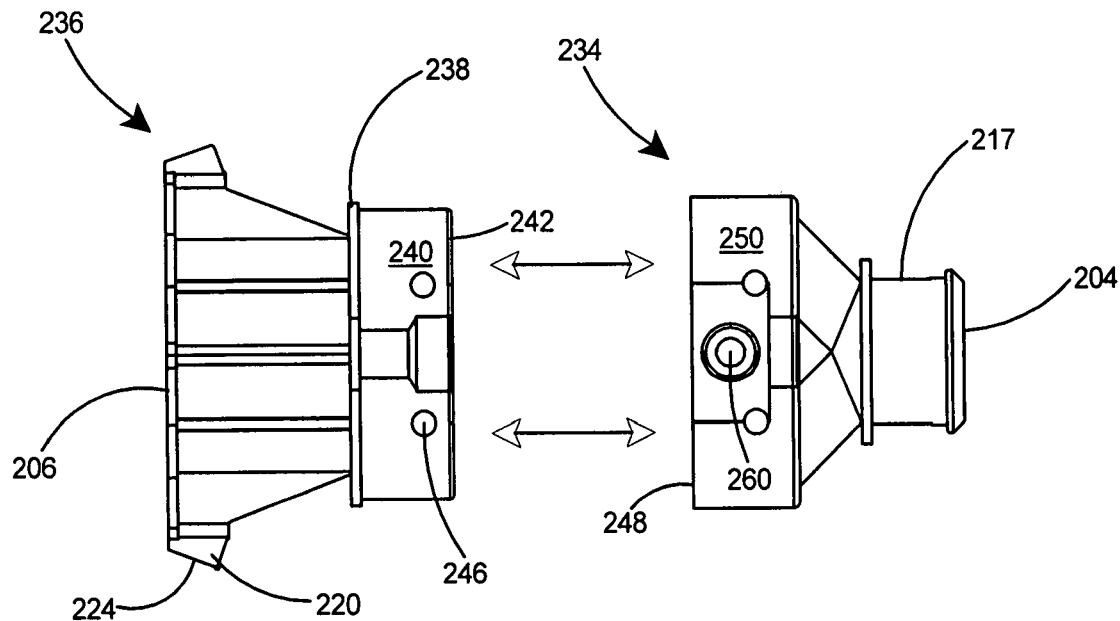
FIG. 41 is a top view of the leading and trailing body portions in alignment to be joined together to form a connector body according to the present invention.

With reference to FIGS. 41-42, pressing the forward nose 240 of the trailing body portion 236 into the skirt 250 of the leading body portion 234 forms the connector body 202 of the present invention. The leading body portion 234 and trailing body portion 236 are secured together by tightening a fastener 262 into the threaded aperture 260.

Figure 43:
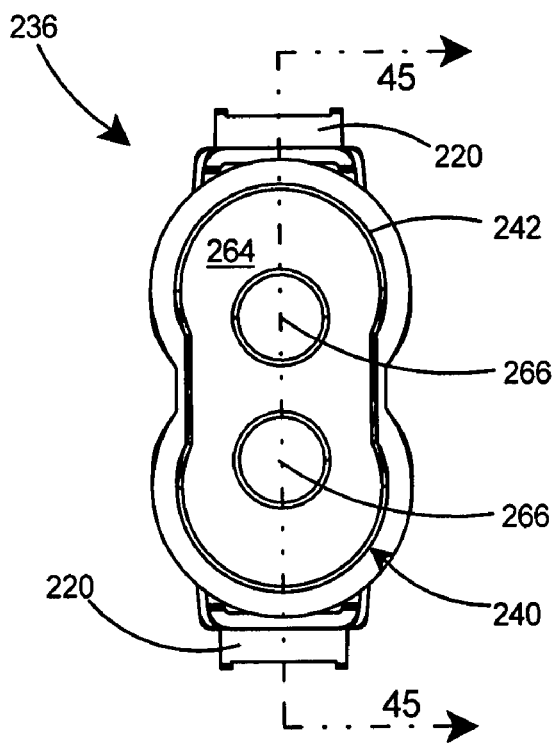
FIG. 43 is a front view of the trailing body portion of FIG. 37.
Figure 44:
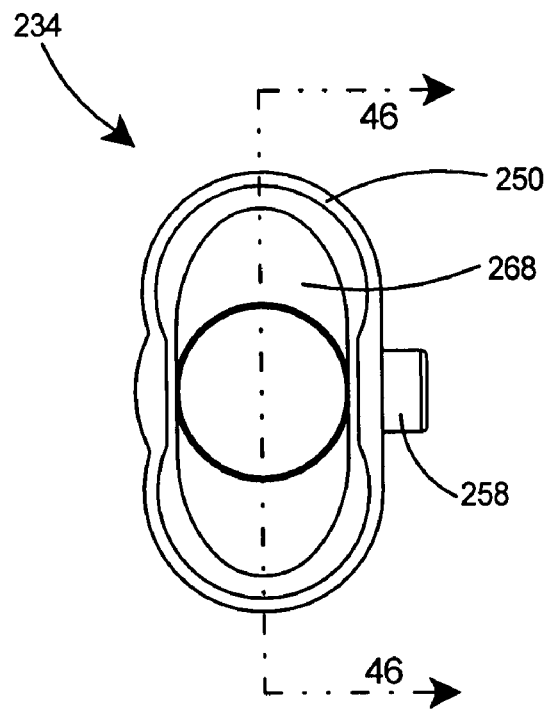
FIG. 44 is a rear view of the leading body portion of FIG. 39.

As shown in FIGS. 43 and 44, the leading edge 242 of the trailing body portion 236 includes an internal wall 264 having a pair of openings 266 therein. The skirt 250 of the leading body portion 234 includes a cavity 268 that is sized and shaped such that the forward nose 240 of the trailing body portion 236 will nest therein.

Figure 45:
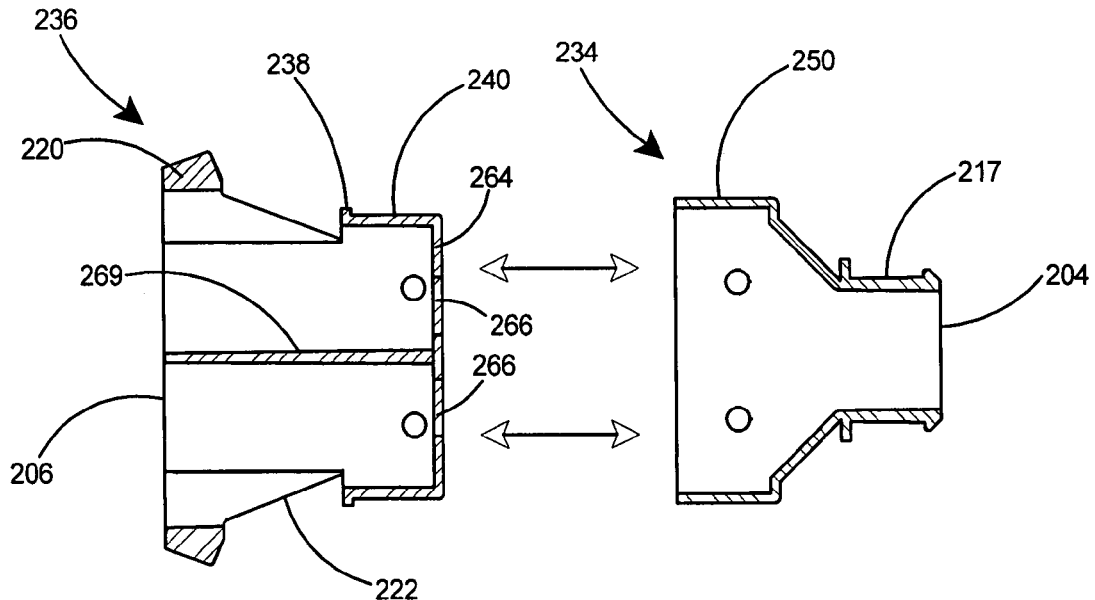
FIG. 45 is a sectional view of the leading and trailing body portions in alignment to be joined together to form a connector body according to the present invention.

With reference to FIGS. 45 and 46, sectional views are shown of the leading 234 and trailing 236 body portions in alignment to be joined together to form the connector body 202 of the present invention. The forward nose 240 of the trailing body portion 236 nests within the skirt 250 of the leading body portion 234 to form the connector body 202. A longitudinal wall 269 divides the trailing body portion 236 and forms the trailing openings 212 at the trailing end 206.

Figure 47:
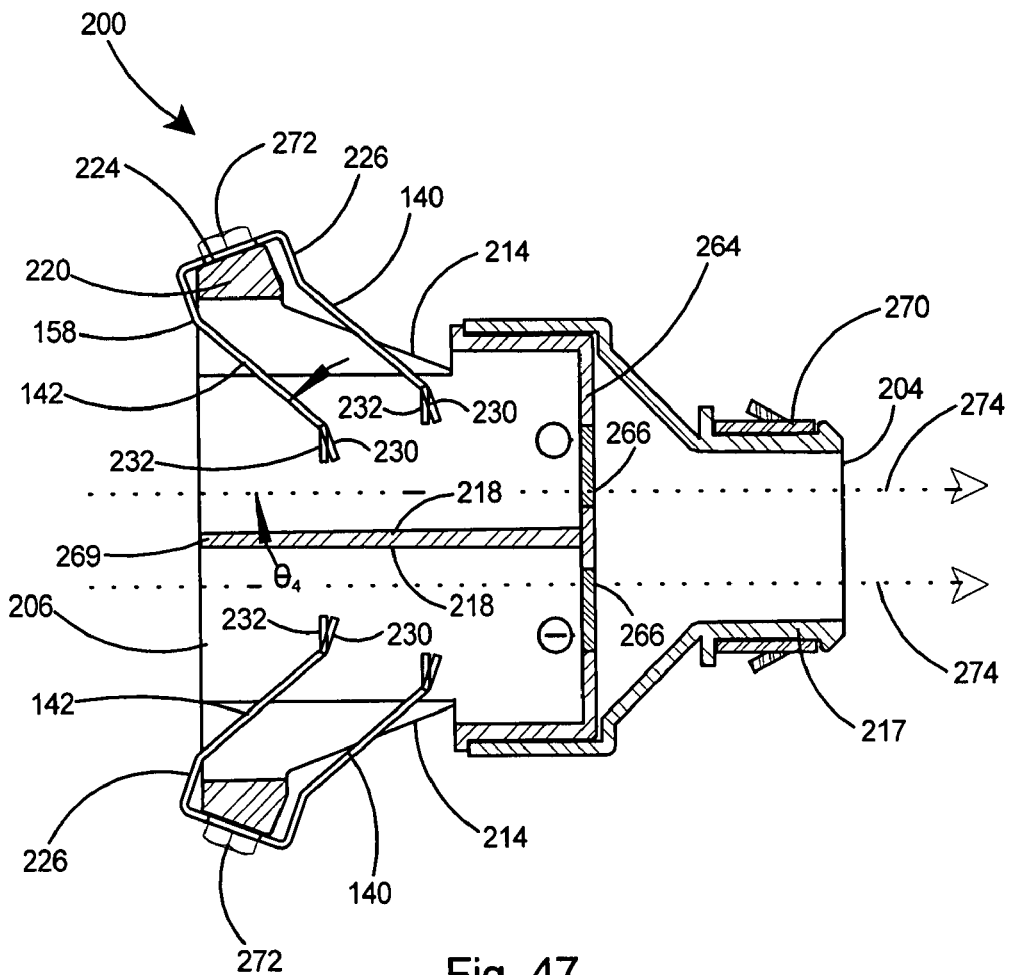
FIG. 47 is a sectional view of the electrical fitting of the present invention.

Referring to FIG. 47, securing a tandem tang 226 to each of the bridges 220 that span the open channels 214 and snapping an attachment arrangement such as a snap ring 270 onto the cylindrical nose portion 217 completes the assembly of the electrical fitting 200. A fastener 272 secures the tandem tangs 226 to the bridge 220. The inclined surface 224 of the bridge 220, combined with the bend of the leading tang 140 and the trailing tang 142 at the first bend line 158, positions each of the tangs 140, 142 at an angle $\theta_4$ with respect to the expected path or axis 274 that a cable (not shown) will take through the electrical fitting 200. Orienting the tangs at angle $\theta_4$ with respect to the cable axis 274 enables tangs 140, 142 of increased length over conventional snap fit connectors. Preferably angle $\theta_4$ is between 10 and 30 degrees. Most preferably, angle $\theta_4$ is 20 degrees. The longer tangs 140, 142 enhance their flexibility as they are cantilevered over a longer distance. The large open channels 214 provide substantial space to allow the tangs 140, 142 to flex outwardly of the cable axis 274 and thereby enable the duplex fitting 200 to accommodate a wide range of cables sizes. The first end leg 230 and second end leg 232 are oriented toward the cable axis 274 and will therefore engage a cable when it is inserted therein and force the cable toward the channel bottoms 218 in each of the open channels 214.

Figure 49:
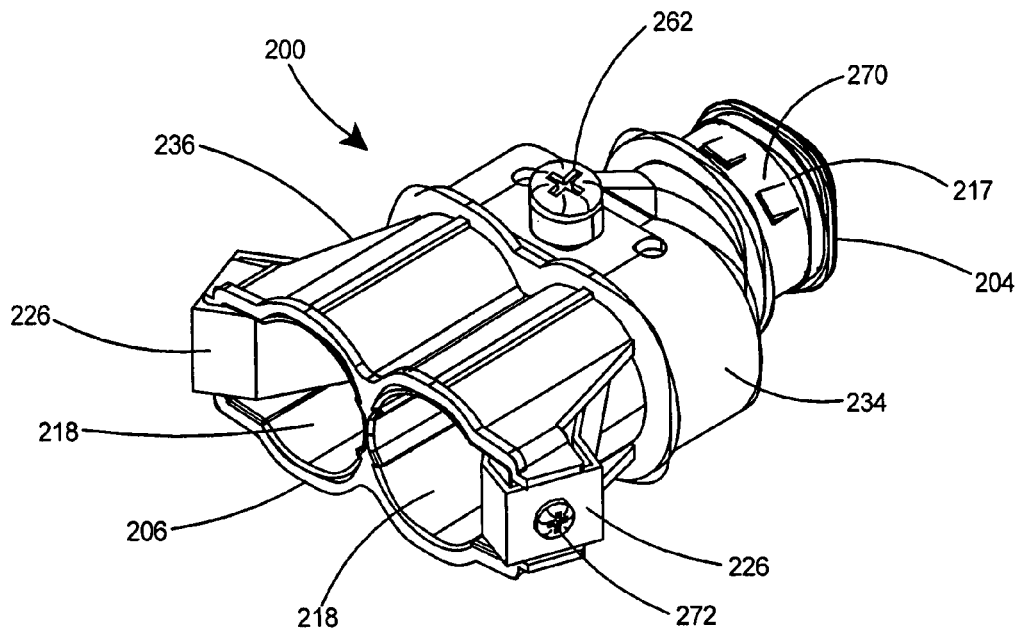
FIG. 49 is a perspective view from the trailing end of a duplex electrical fitting according to the present invention.

For an understanding of the operation of the duplex electrical fitting 200, reference is made to FIGS. 48 and 49. The duplex electrical fitting 200 is provided in one integral piece as shown in FIG. 49, with the snap ring 270 secured to the nose portion 217, the tandem tangs 226 secured to the inclined surface 224 of the bridges 220, and the leading and trailing body portions 234 and 236 secured together by fastener 262. The leading end 204 of the duplex fitting 200 is pressed into an appropriately sized knockout hole (not shown) in a panel. Two cables 227 can then be connected to the trailing end 206 of the duplex fitting 200 by inserting each of the cables 227 into one of the respective trailing openings 212 on the duplex electrical fitting 200. As shown in FIG. 48, the leading tang 140 and trailing tang 142 engage successive grooves 278 in each of the cables 227. The holding ability of the tangs 140, 142 is enhanced by the tangs being arranged to engage the cable 227 in a back to back manner with respect to the grooves 278 in the cable 227. As a result of the tangs 140, 142 being constructed of spring steel, the first and second end legs 230 and 232 strongly force the cables 227 against the bottom 218 of each open channel 214. As a result of forcing the cables 227 against the bottom 218, the opposite side of the cable 227 contacts the longitudinal wall 269. By providing two end legs 230 and 232 oriented at 20 degrees apart, additional surface contact is created against the cable surface. Further enhancement of the surface contact of the tangs against the cable 227 is achieved by providing a semicircular notch 102 (see FIG. 51) at the engagement end of the end legs 230, 232. The semicircular notch 102 has a curvature approximating the expected curvature of the cable groove 278. Therefore, as shown in FIG. 48, the two end legs 230 and 232 provide contact virtually along their entire lower edges 102 and apply the contact to the cable surface on both sides of the groove 278. As a net result, the duplex electrical connector 200 of the present invention provides an exceptional grip on the inserted cables. Preferably the radius of curvature of the semicircular notch 102 (see FIG. 51) is between 0.29 and 0.33 inch.

With reference to FIG. 41, the leading body portion 234 and trailing body portion 236 may each be molded in one piece of a suitable plastic or cast of metal. The tandem tang is preferably constructed of spring steel. The duplex electrical fitting may further include a tubular insert 84 such as that shown in FIGS. 8 and 9 to protect the outer sheaths of any wiring (not shown) that is later advanced through the electrical fitting.

As shown in FIG. 48, the duplex electrical fitting 200 with a snap ring 270 on the leading end 204 provides a larger leading opening 210 than is generally available with prior art electrical fittings utilizing frustoconical snap rings (not shown). The larger leading opening 210 allows much easier insertion of cables 227 through the fitting 200. As a result of the large leading opening 210 and the tandem tangs 226 being secured to the exterior of the duplex electrical fitting 200, a straight-through path is available for insertion of each of the two cables 227. Thus the electrical cables 227 and their electrical leads or wires 280 are easily inserted into the duplex fitting 200 without obstruction. As a result of the pair of openings 266 in the internal wall 264 at the leading end of the trailing body portion 236, the cables 227 and electrical leads 280 are guided to the leading opening 210. The tandem tangs 226 force the cables 227 against the bottom 218 of the open channel 214 and thereby ensure that the electrical cables 227 and wires 280 are in alignment with the leading opening 210. Prior art fittings utilizing frustoconical snap rings greatly reduce the diameter of the leading opening thereby causing an obstruction to any cables being inserted therein as a result of the necked down shoulder and the small leading opening. The cylindrical nose portion 217 on the leading end 204 allows larger diameter hole than on prior art fittings having frustoconical snap rings. As a result of the large open channels 214, the exterior attachment of the tandem tangs 226, the longer length and enhanced range of flexing available to the tangs 140 and 142, and the large leading opening 210, it is significantly easier to insert cable through the fitting of the present invention versus prior art fittings utilizing frustoconical snap rings. The leading opening 210 of the duplex electrical fitting 200 is circular in shape and is at least 0.59 inch in diameter.

Figure 47A:
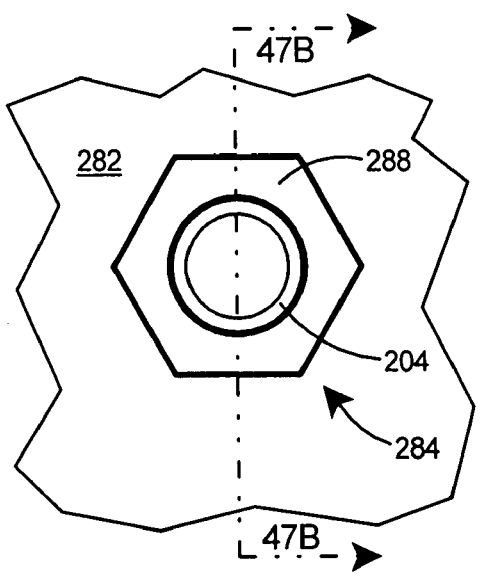
FIG. 47A is a front view of an electrical fitting having an alternative attachment arrangement including a threaded nose portion and a locknut for securing the electrical fitting to a panel or electrical box.
Figure 47B:
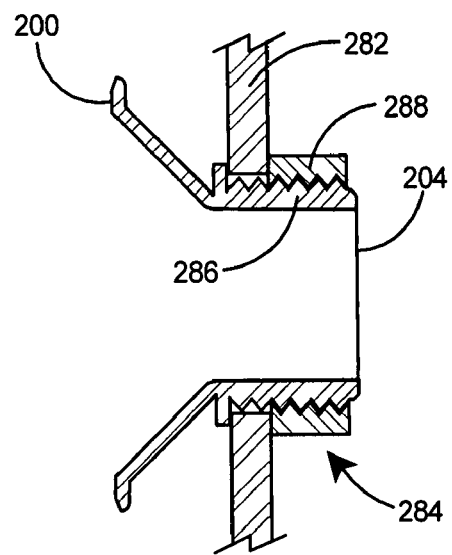
FIG. 47B is a sectional view taken along line 47B-47B of the threaded nose portion and locknut of FIG. 47A.

With reference to FIGS. 47A and 47B, in addition to the snap ring 270 shown in FIG. 47, the leading end 204 of the electrical fitting 200 can be secured to an electrical box or electrical panel 282 by an alternative attachment arrangement 284 consisting of a threaded nose portion 286 on the electrical fitting and a locknut 288.

Figure 52:
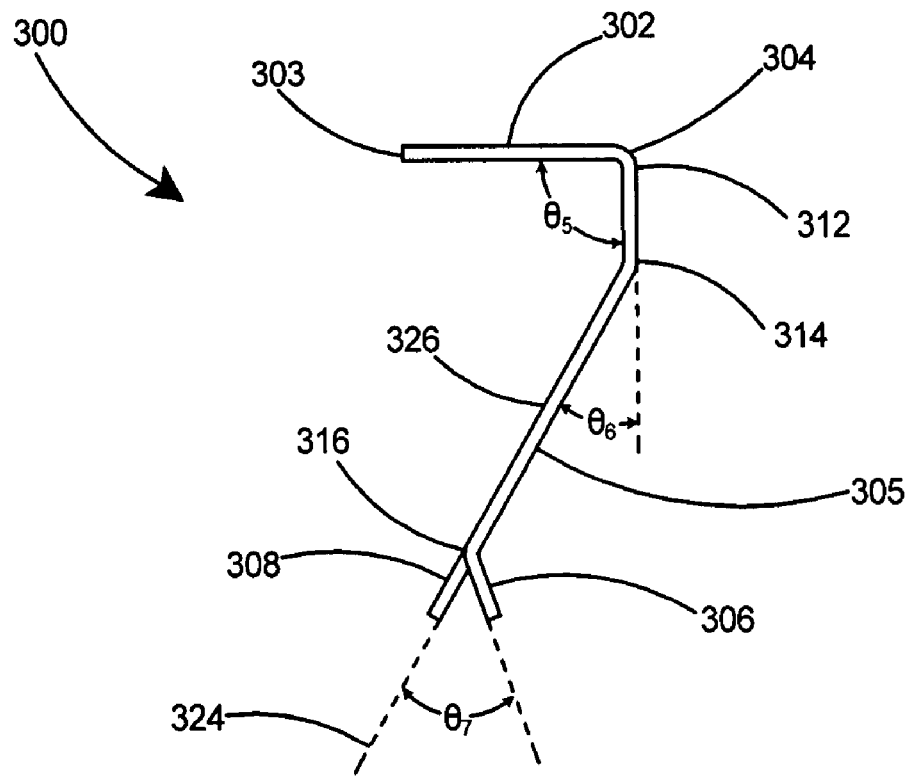
FIG. 52 is a side view of a second embodiment of a clip member according to the present invention.
Figure 53:
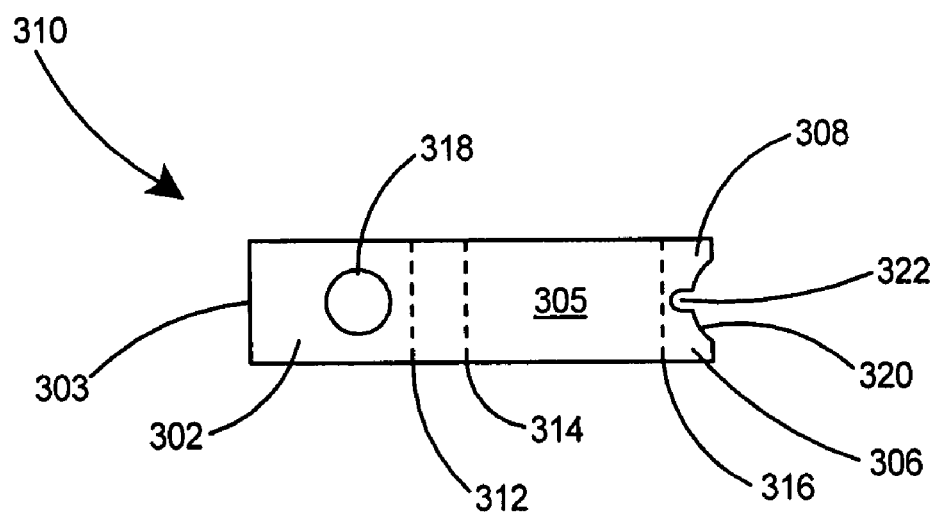
FIG. 53 is a plan view of a blank that is used to form the clip member of FIG. 52.

With reference to FIGS. 52 and 53 there is shown a second embodiment of a clip member 300 according to the present invention. The clip member 300 includes a base portion 302 having a leading end 303 and a trailing end 304 and a leg 305 extending from the base portion 302. The leg 305 has splayed end portions including a first end portion 306 and a second end portion 308 as the end portions 305, 306 spread outward in different directions. The clip member 300 is formed from a flat blank 310 as shown in FIG. 53. Bend lines 312, 314, and 316 denote the locations on the blank 310 at which bends are made to form the clip member 300. An aperture 318 is included in the base portion 302 of the clip member 300. The end portions 306 and 308 of the clip member 300 include an arcuate end 320 and a notch 322 extending from the arcuate end 320 into the leg 305. As shown in FIG. 52, the second embodiment of the clip member 300 is bent at bend line 312 preferably at an angle $\theta_5$ of between 60 and 90 degrees with respect to the base portion 302, angle of 90 degrees is shown, to form the leg 305. The leg 305 may include a maximum of one bend at bend line 314 to create angle $\theta_6$ as shown. The first end portion 306 is bent out of the plane 324 in which the major portion 326 of leg 305 resides at bend line 316 preferably by an angle $\theta_7$ of between 20 and 60 degrees, and most preferably by an angle of 50 degrees. The second end portion 308 may reside in the same plane 324 as the major leg portion 326 or may be bent at an angle of 30 degrees with respect to the major leg portion 326.

Figure 54:
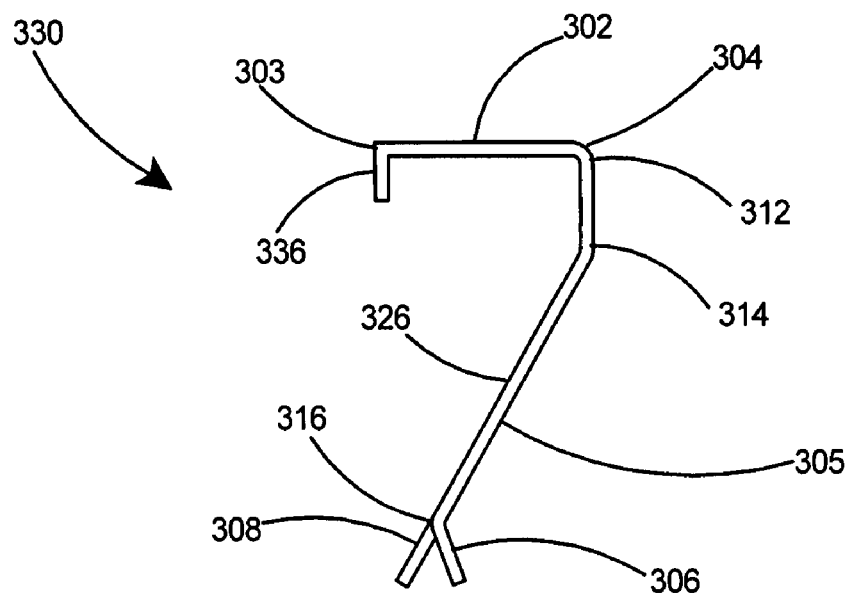
FIG. 54 is a side view of a third embodiment of a clip member according to the present invention.
Figure 55:
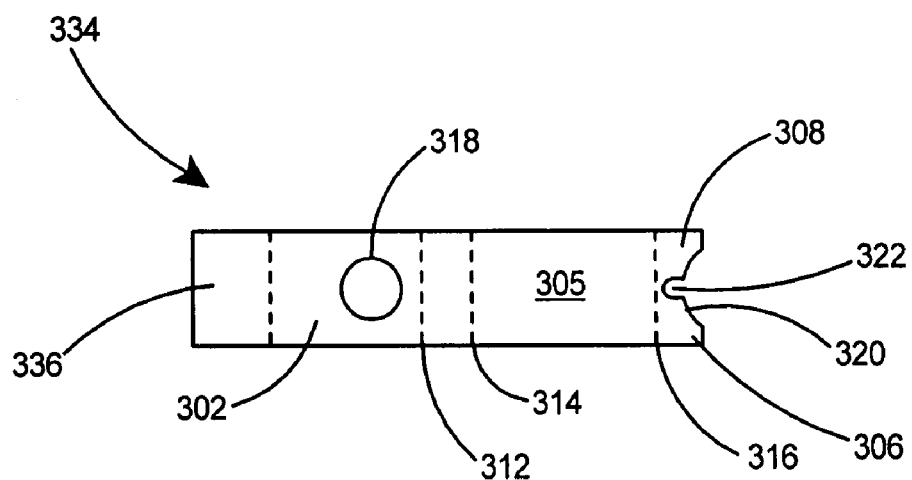
FIG. 55 is a plan view of a blank that is used to form the clip member of FIG. 54.

Reference is made to FIGS. 54 and 55 in which a third embodiment of a clip member 330 is depicted. The third embodiment of the clip member 330 is similar to the second embodiment with a leg 305 extending from the trailing end 304 of the base portion 302 but includes an additional bend line 332 as shown. The blank 334 is bent preferably at 90 degrees at bend line 332 to form a forward lip 336 at the leading end 303 of the base portion 302 of the clip member 330.

Figure 56:
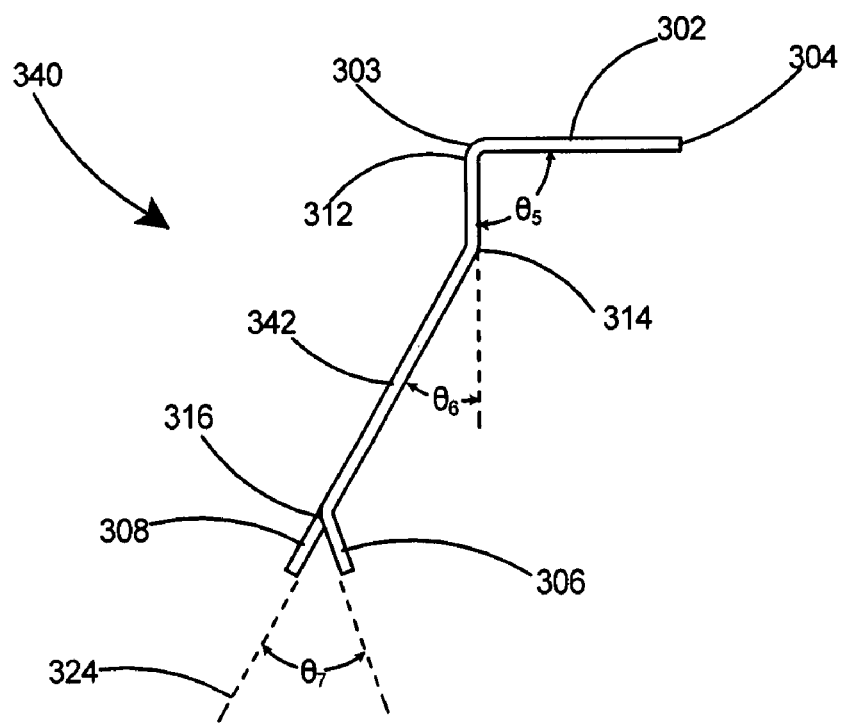
FIG. 56 is a side view of a fourth embodiment of a clip member according to the present invention.
Figure 57:
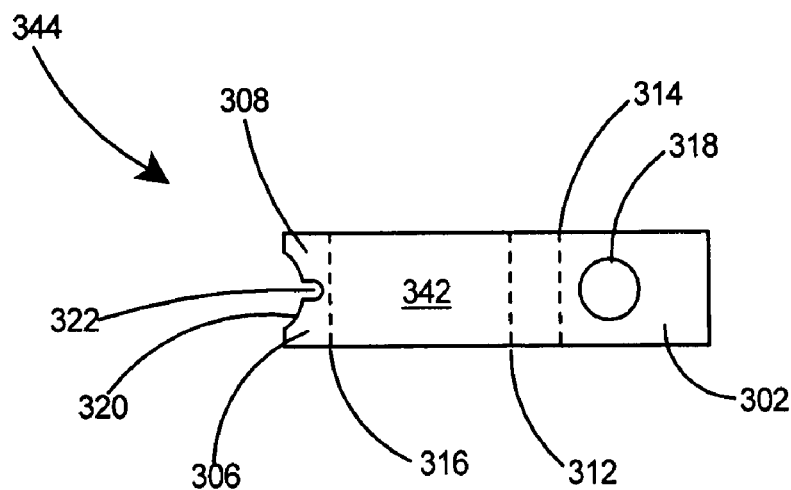
FIG. 57 is a plan view of a blank that is used to form the clip member of FIG. 56.

A fourth embodiment of the clip member 340, depicted in FIG. 56, includes a leading leg 342 extending from the leading end 303 of the base portion 302. The leading leg 342 is shaped similar to the leg of the second embodiment with angle $\theta_5$ preferably equal to 90 degrees, angle $\theta_6$ preferably equal to 30 degrees, and angle $\theta_7$ equal to 50 degrees. As shown in FIG. 57, the clip member 340 is formed from blank 344 having bend lines 312, 314, and 316.

Figure 58:
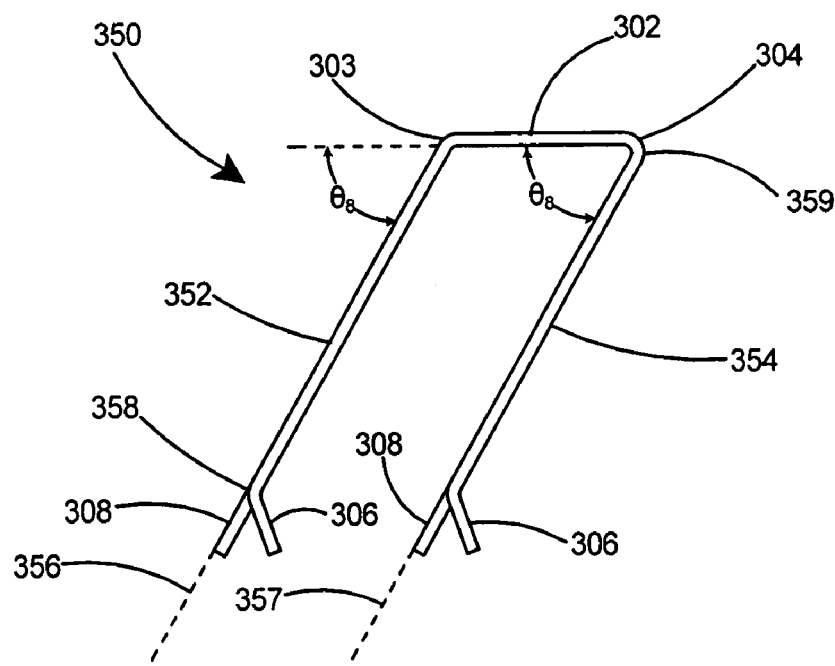
FIG. 58 is a side view of a fifth embodiment of a clip member according to the present invention.
Figure 59:
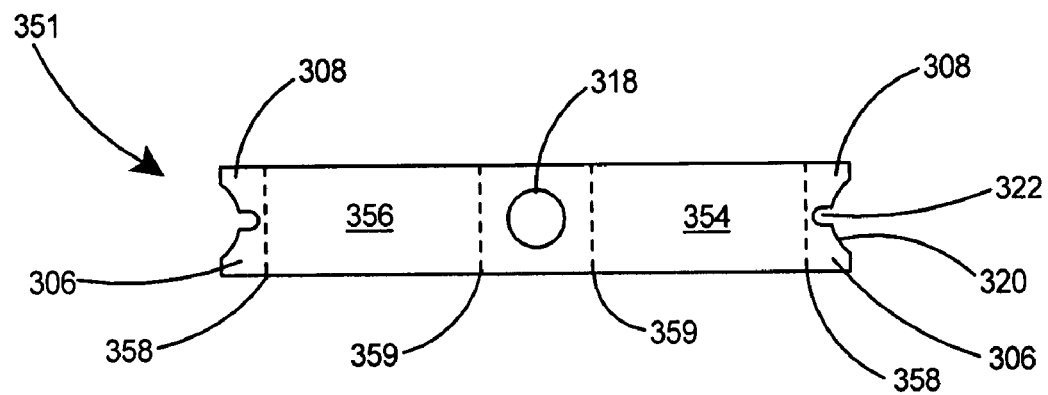
FIG. 59 is a plan view of a blank that is used to form the clip member of FIG. 58.

A fifth embodiment of the clip member 350, depicted in FIG. 58, and the blank 351 it is formed from, depicted in FIG. 59, includes a leading leg 352 and a trailing leg 354 extending from the base portion 302. There are no further bends in the legs 352 and 354, which extend straight to the end portions 306 and 308. The first end portion 306 is bent out of the planes 356 and 357 in which the legs 352 and 354 reside at bend lines 358 most preferably by an angle of 50 degrees. The legs 352 and 354 are preferably bent at bend lines 359 at an angle $\theta_8$ of 60 degrees with respect to the base portion 302 of the clip member 350.

Figure 60:
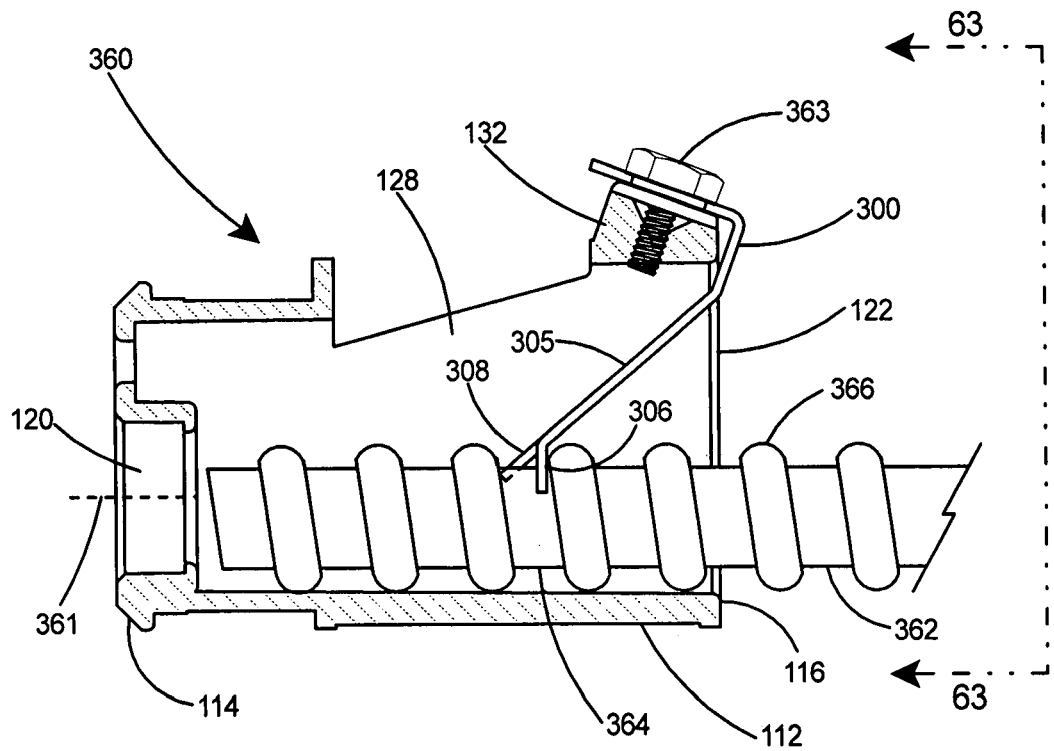
FIG. 60 is a sectional view of an electrical fitting according to the present invention including the clip member of FIG. 52 securing an electrical cable therein.

With reference to FIG. 60 there is shown an electrical fitting 360 formed with connector body 112 and clip member 300. An electrical cable 362 inserted in the trailing opening 122 of the connector body 112 is forced to the bottom 130 of the open channel 128. The leading opening 120 of the connector body 112 is canted off-center of the leading end 114, and as a result, an electrical cable 362 inserted into the electrical fitting 360 and forced to the bottom 130 of the open channel 128 by the clip member 300 will furthermore align the cable 362 with the central axis 361 of the leading opening 120. This is an improvement over prior art cable connectors in which the cable and the leading opening do not align as a result of the leading opening being centered on the leading end and the cable being forced to one side by a cable retaining device. The electrical cable 362 includes grooves 364 and peaks 366 therein on the outer surface of the cable. Connecting the electrical cable 362 to the electrical fitting 360 is very simple as the cable 362 is simply pushed into the trailing end 116 of the connector body 112. The base portion 302 of the clip member is secured to the bridge 132 by fastener 363 and the long leg 305 of the clip member 300 is therefore cantilevered from the base portion 302. As the clip member 300 is preferably constructed of spring steel, the long leg 305 is flexible and flexes upward as the cable 362 is inserted therein, with the leg 305 flexing upwards as each peak 366 contacts end portions 306 and 308. When the electrical cable 362 has been fully inserted into the open channel 128, the end portions 306 and 308 seat in a groove 364. Having end portion 306 bent at a 50 degree angle to the leg 305 enables the end portions 306 and 308 to span the groove 364 and thereby securely lock the electrical cable 362 to the fitting 360. The electrical fitting 360 securely locks the cable 362 into the fitting and provides good electrical continuity between the fitting 360 and the electrical cable 362 as a result of the secure locking of the cable 362 into the fitting 360 and the substantial contact between the peaks 366 of the cable 362 and the inner walls of the electrical fitting 360 at the channel bottom 130.

Figure 63:
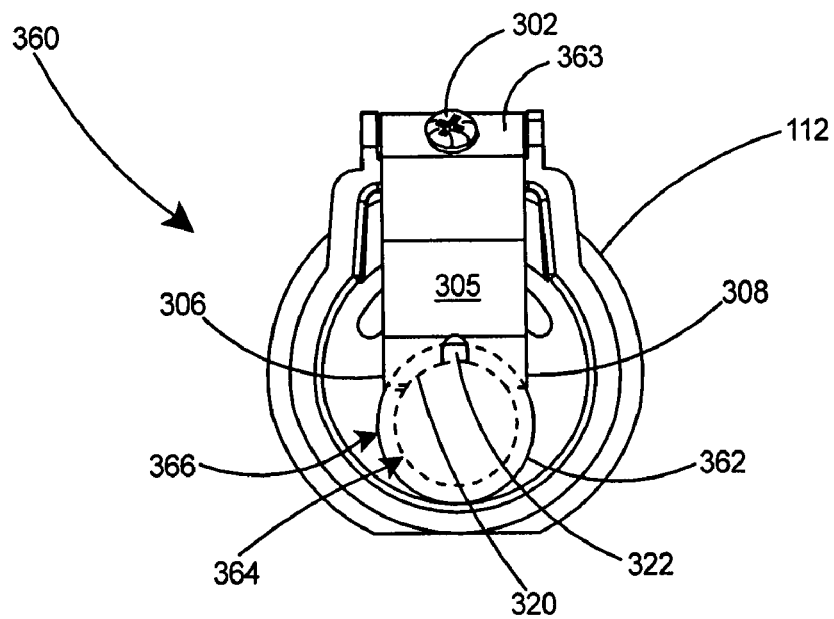
FIG. 63 is view of an electrical fitting and inserted electrical cable taken from lines 63-63 of FIG. 60.

With reference to FIG. 63, the electrical cable 362 is locked therein into the electrical fitting 360 by end portions 306 and 308, which extend completely into the groove 364 and contact the surface of the cable 362 within the groove 364. The combination of the resiliency and strength of the clip member 350, being constructed of spring steel, and the substantial surface contact between arcuate surface 320 of the end portions 306 and 308 and the surface of the groove 364, provide good electrical continuity between the electrical fitting 360 and the electrical cable 362.

Figure 61:
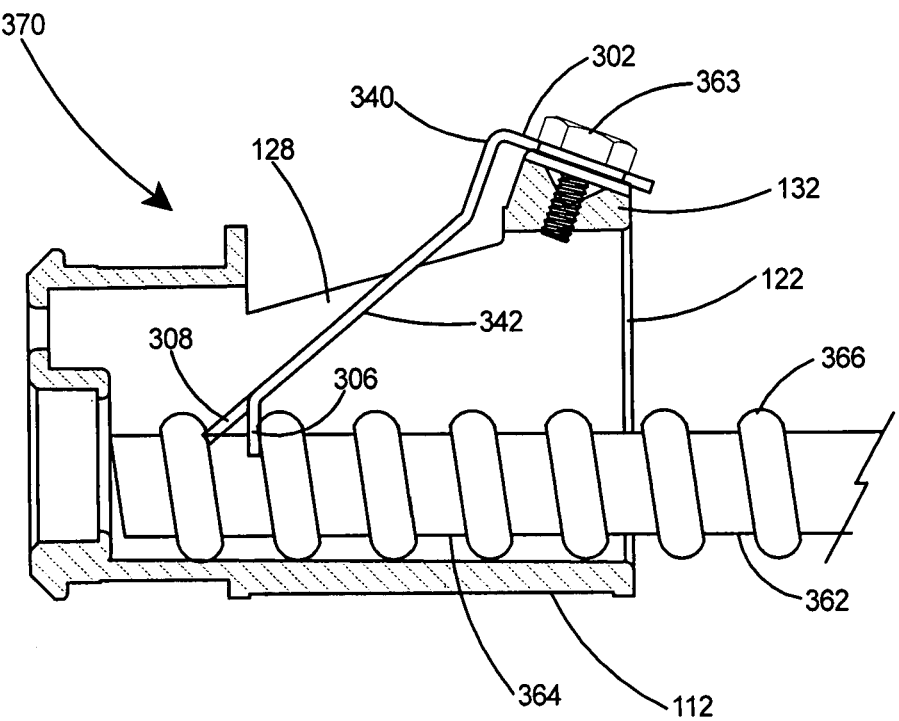
FIG. 61 is a sectional view of an electrical fitting according to the present invention including the clip member of FIG. 56 securing an electrical cable therein.

Reference is made to FIG. 61 in which an electrical fitting 370 is formed with connector body 112 and the fourth embodiment of the clip member 340. Leading leg 342 of clip member 340 extends from bridge 132 through the open channel 128. Electrical cable 362 is locked into fitting 370 by first 306 and second 308 end portions, which seat in groove 364 of cable 362.

Figure 62:
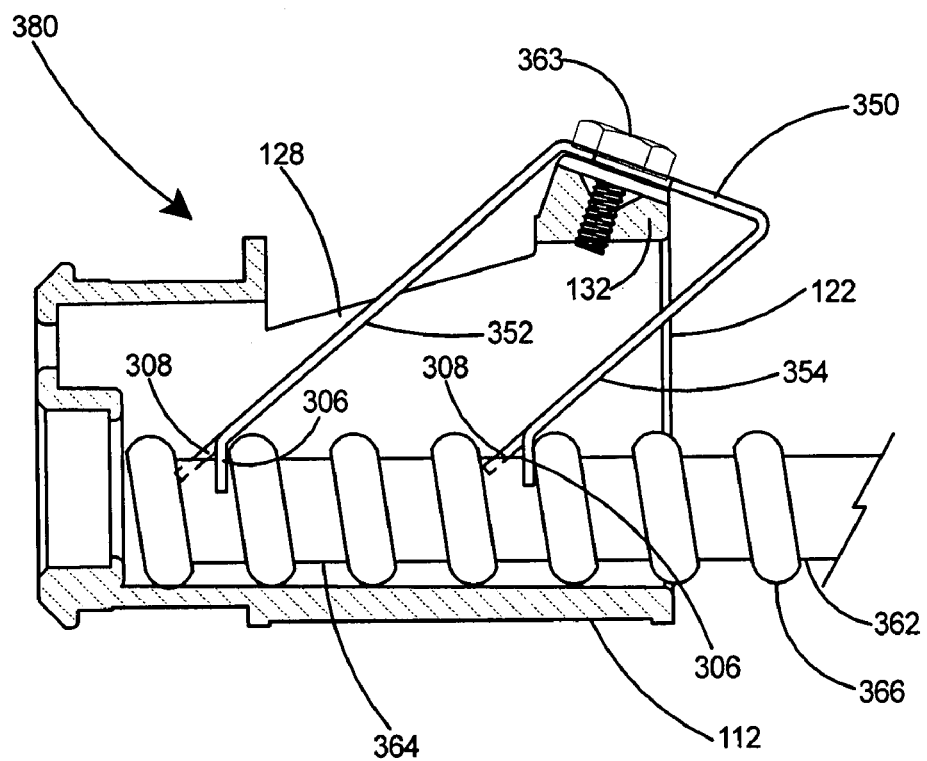
FIG. 62 is a sectional view of an electrical fitting according to the present invention including the clip member of FIG. 58 securing an electrical cable therein.

Referring to FIG. 62, an electrical fitting 380 is formed with connector body 112 and the fifth embodiment of the clip member 350. Leading leg 352 of clip member 350 extends from bridge 132 through the open channel 128 and trailing leg 354 extends through the trailing opening 122 of the connector body 112. Electrical cable 362 is locked into fitting 380 by first 306 and second 308 end portions on both leading leg 352 and trailing leg 354. The end portions 306 and 308 on each leg 352 and 354 seat in separate grooves 364 of cable 362. An electrical fitting 380 according to the present invention, which uses a fastener 363 to secure the clip member 350 to the connector body 112, permits an installer to easily remove the electrical cable 362 from the fitting 380 in case the installer must subsequently move the fitting after it has been secured in a given location. This is an advantage over prior art connectors in which the clip members are secured by more permanent means, such as clip members that are held on by portions of the connector body that are deformed to secure the clip member.

With reference to the blanks depicted in FIGS. 53, 55, 57, and 59, the clip members described herein have intact edges and are not die-cut or slit from the sides. Die-cuts or slits should be avoided in the clip members, as they narrow the width of the clip members in one small area and therefore concentrate stresses over a narrow portion of the clip member. Die-cut or slit sides are undesirable therefore as they could cause stress cracks and eventual failure at the location of the die-cuts or slits.

Figure 64:
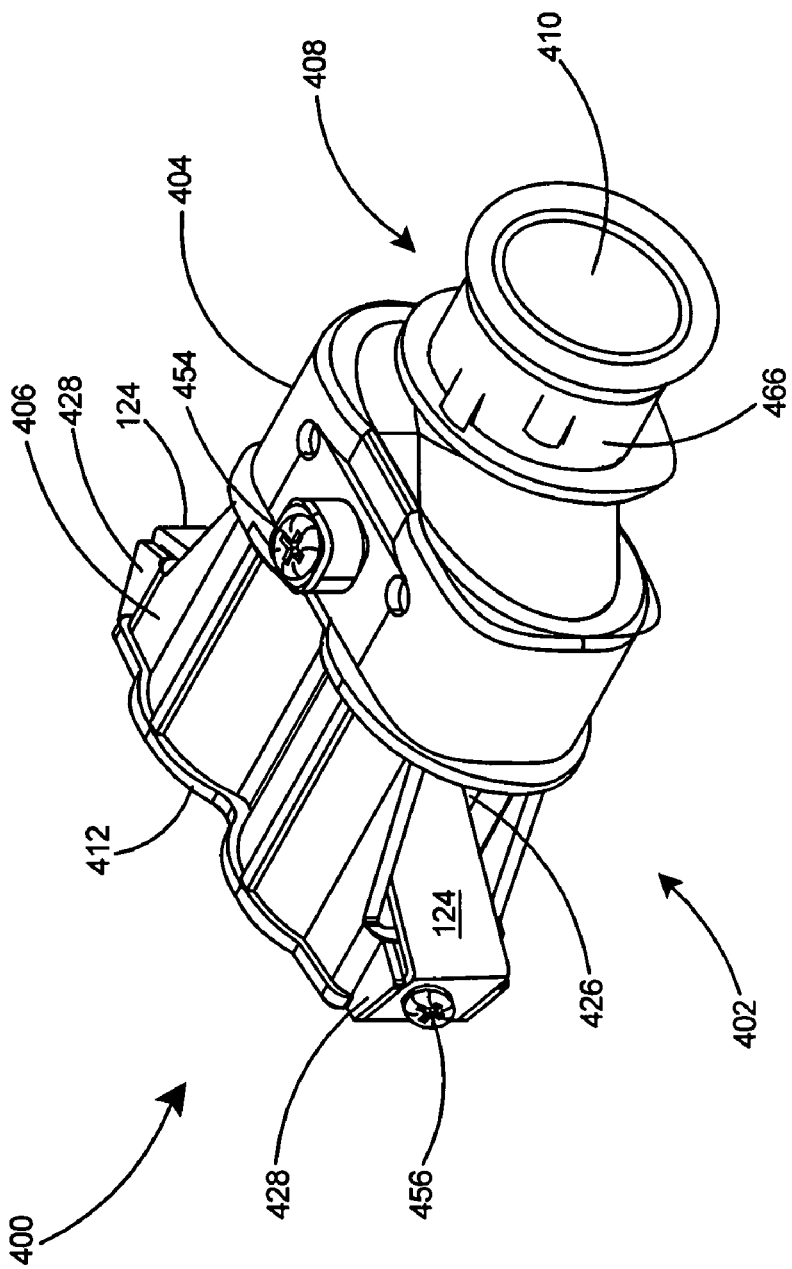
FIG. 64 is a perspective view from the leading end of the preferred embodiment of an electrical fitting according to the present invention.

With reference to FIG. 64 there is shown a preferred embodiment of an electrical fitting 400 according to the present invention. The electrical fitting 400 includes a connector body 402 including a leading body portion 404 and a trailing body portion 406. The leading body portion 404 includes a nose portion 408 having an outlet bore 410 therein.

Figure 65:
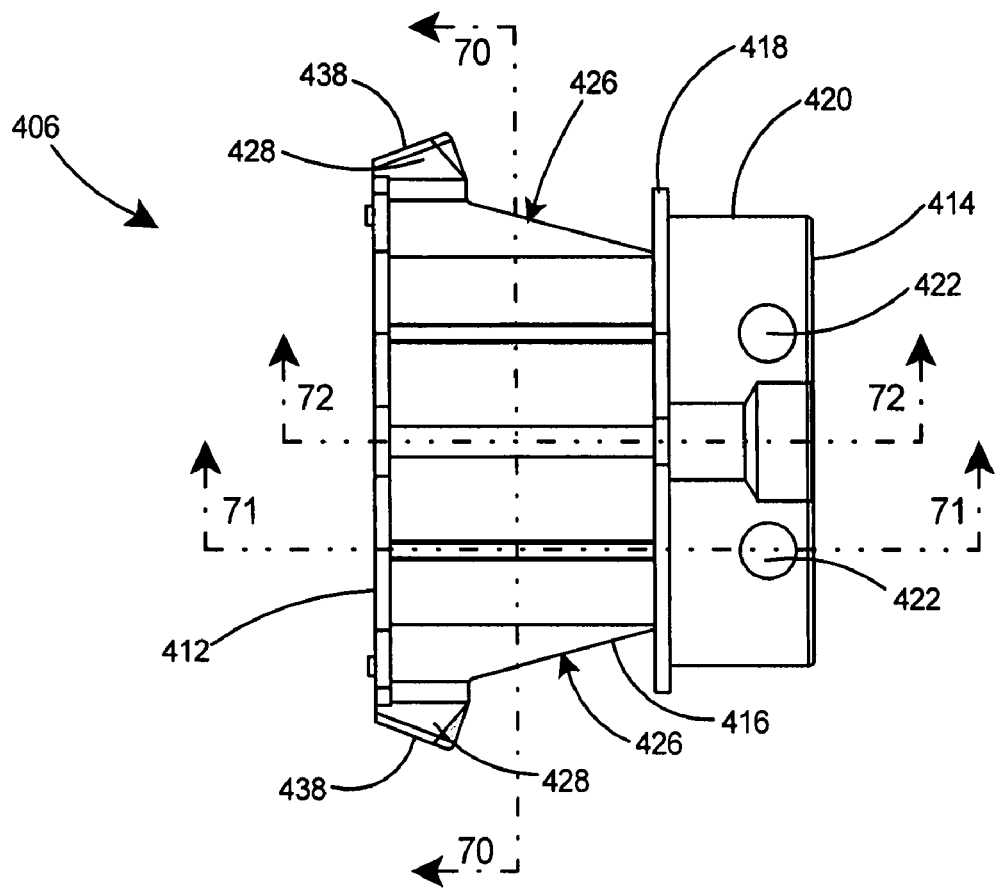
FIG. 65 is a top view of a trailing body portion that forms a portion of the connector body of FIG. 64.
Figure 66:
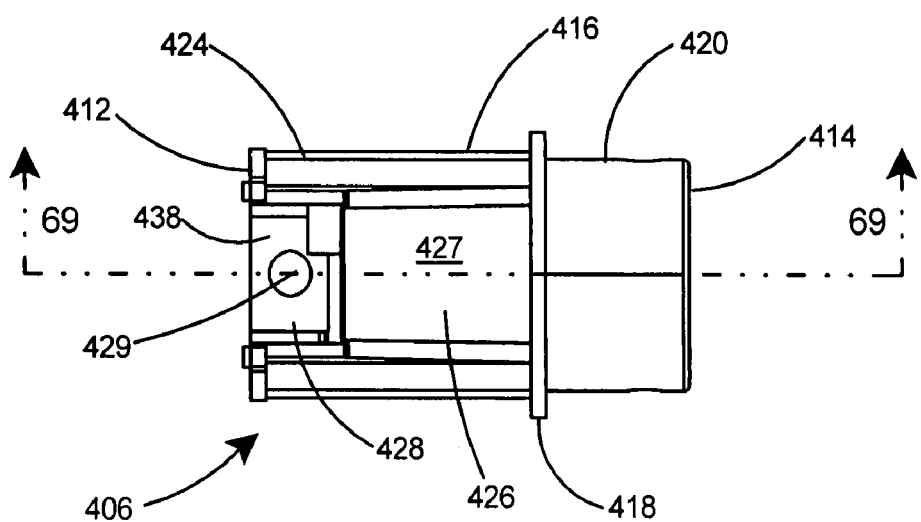
FIG. 66 is a side view of the trailing body portion of FIG. 65.

As shown in FIGS. 65 and 66, in the preferred embodiment of the electrical fitting, the trailing body portion 406 includes a trailing end 412, a leading edge 414, a midportion 416, and an intermediate flange 418. A front portion 420 extends forward of the flange 418 and includes one or more view ports 422. The trailing body portion 406 includes sidewalls 424 and an open channel 426 extending from the trailing end 412 to the midportion 416. The open channels 426 include a channel bottom 427 therein. A bridge 428 adjacent the trailing end 412 bridges across the open channels 426 and includes an aperture 429 therein.

Figure 69:
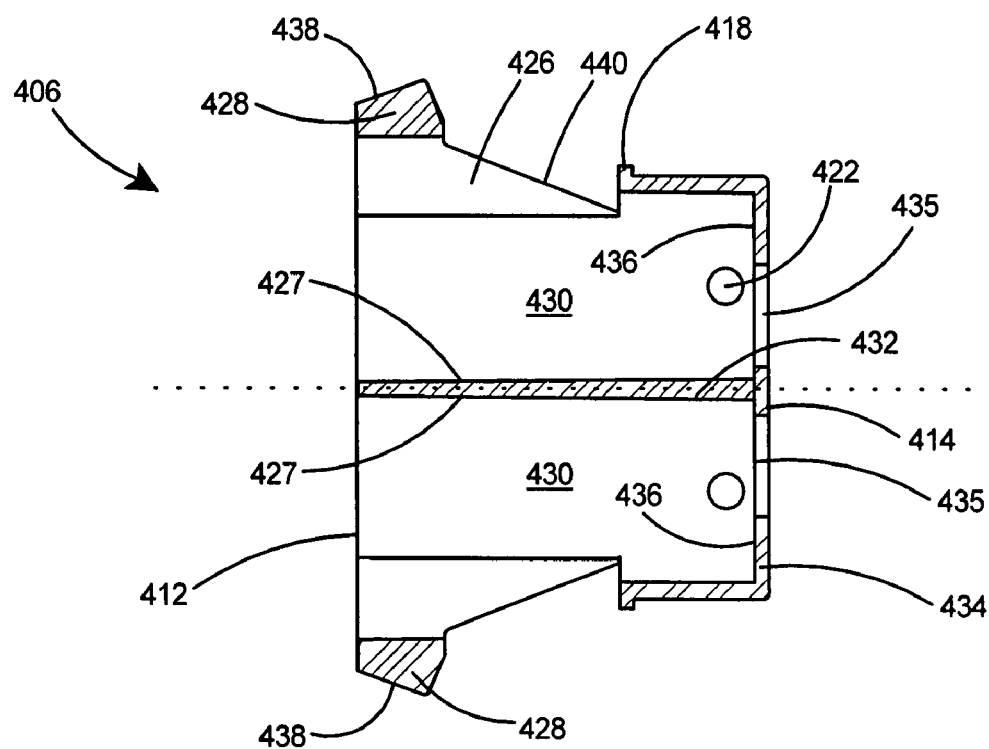
FIG. 69 is a sectional view of the trailing body portion taken along line 69-69 of FIG. 65.
Figure 70:
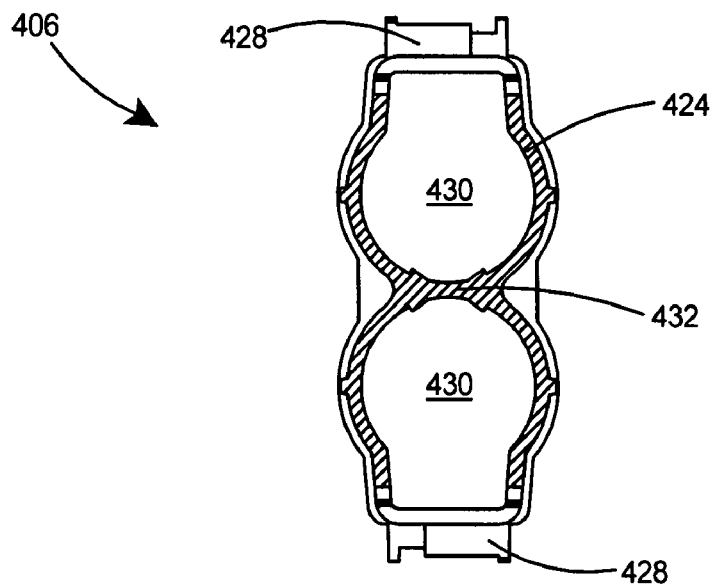
FIG. 70 is a sectional view of the trailing body portion taken along line 70-70 of FIG. 65.

Referring to FIGS. 69 and 70, the trailing body portion 406 includes two inlet bores 430 separated by a longitudinal wall 432. The trailing body portion 406 further includes a transverse wall 434 at a forward end 436 of the inlet bores 430. An opening 435 is provided in the transverse wall 434 at the forward end 436 of each of the inlet bores 430. As shown in FIG. 69, each bridge 428 on the trailing body portion 406 includes an inclined surface 438 thereon. Two ramps 440 extend outwardly and rearwardly from the midportion 416 of the trailing body portion 406 to provide support for each bridge 428.

Figure 67:
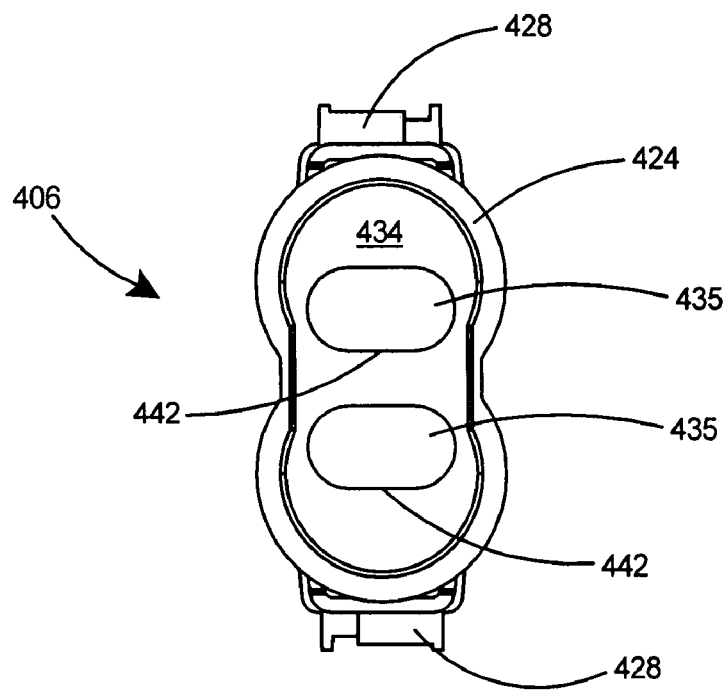
FIG. 67 is a front view of the trailing body portion of FIG. 65.
Figure 68:
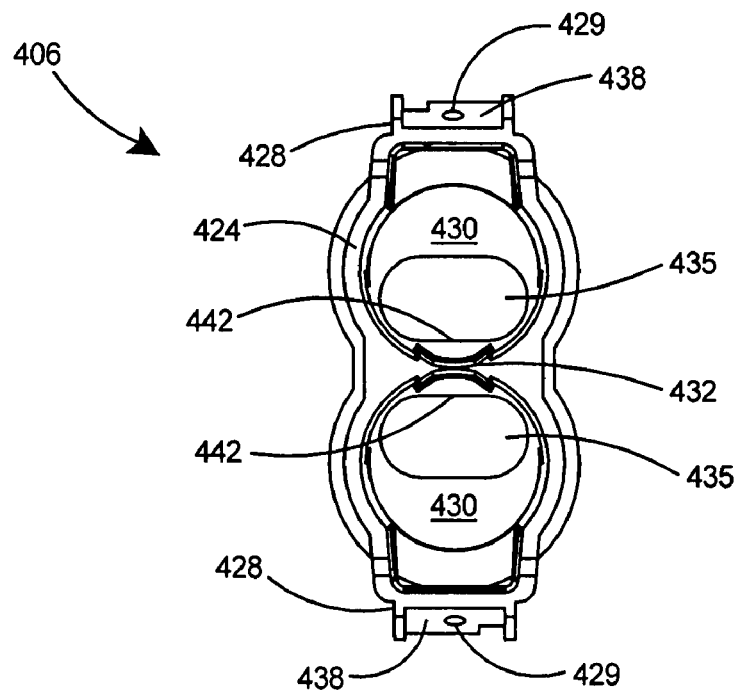
FIG. 68 is a rear view of the trailing body portion of FIG. 65.

As shown in FIGS. 67 and 68, the openings 435 in the transverse wall 434 are substantially oval-shaped. The oval-shaped openings 435 include long sides 442 that are substantially parallel to the longitudinal wall 432.

Figure 71:
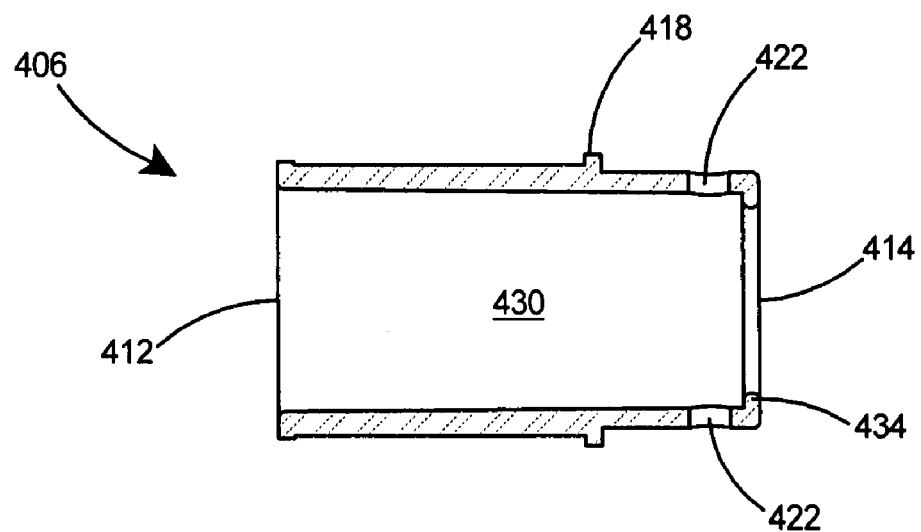
FIG. 71 is a sectional view of the trailing body portion taken along line 71-71 of FIG. 65.
Figure 72:
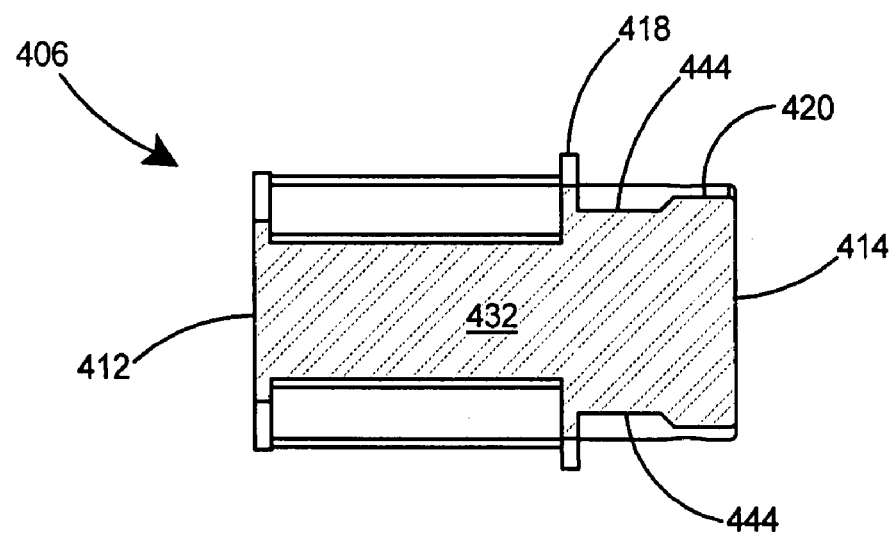
FIG. 72 is a sectional view of the trailing body portion taken along line 72-72 of FIG. 65.

As shown in FIGS. 71 and 72, the longitudinal wall 432 is situated along the longitudinal center of the trailing body portion 406 (line 72-72 of FIG. 65). A depression 444 is provided on the front portion 420 of the trailing body portion 406 for later securing the trailing body portion 206 to the leading body portion 404 (see FIG. 73). The inlet bores 430 extend from the trailing end 412 to the transverse wall 434.

Figure 73:
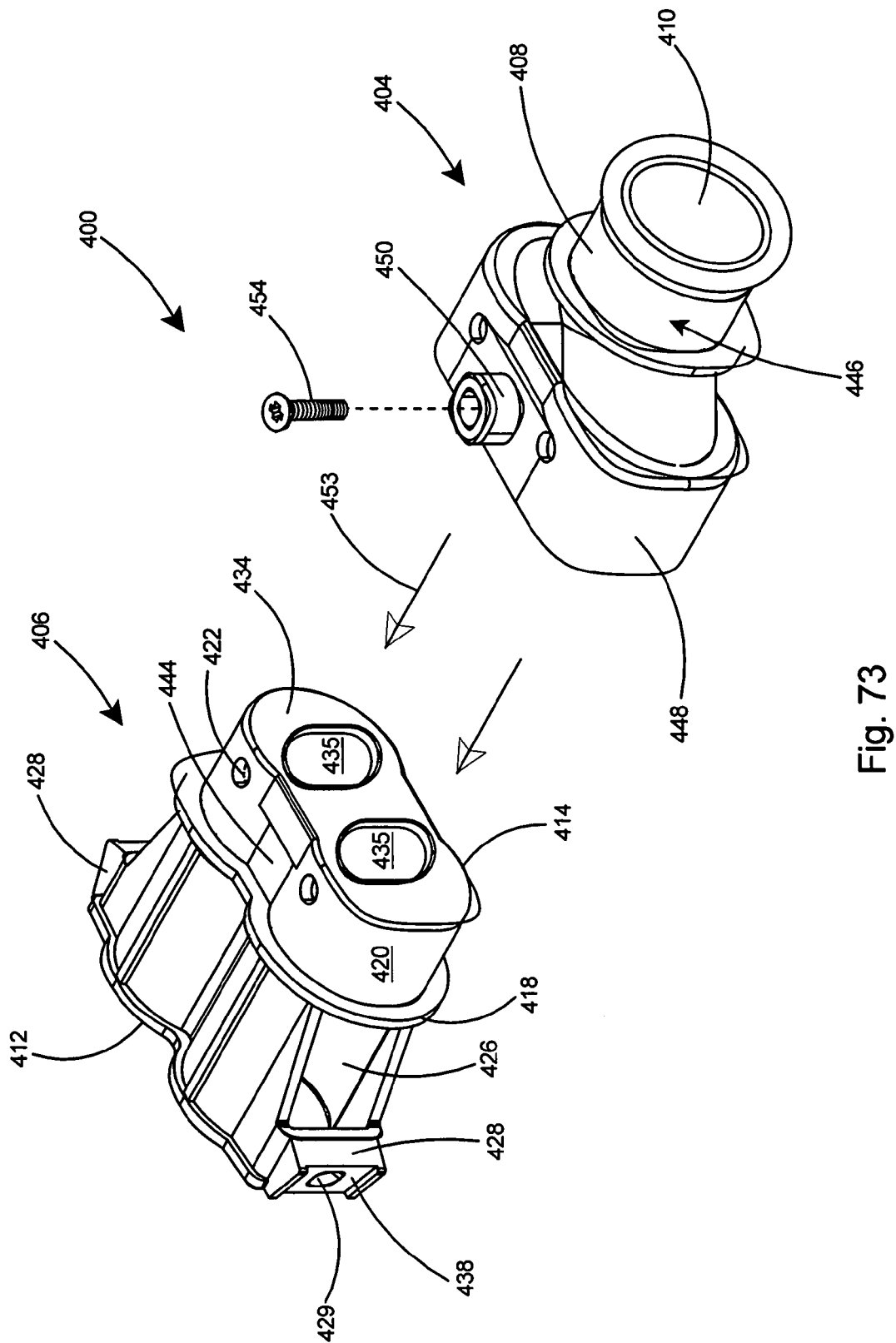
FIG. 73 is a perspective view of the leading and trailing body portions in alignment to be joined together to form the preferred embodiment of a connector body according to the present invention.

With reference to FIG. 73, the nose portion 408 of the leading body portion 404 includes a cylindrical seat 446 thereon. The leading body portion 404 further includes a skirt 448 with an integral boss 450 thereon. A shoulder 452 connects the skirt 448 to the nose portion 408 of the leading body portion 404. As shown by the directional arrows 453 in FIG. 73, the leading body portion 404 may be secured to the trailing body portion 406 and secured thereto by fastener 454. The fastener 454 is tightened through boss 450 and seats in the depression 444 of the trailing body portion 406.

With reference to FIGS. 30-34, a clip member such as the tandem tang 124 is used with the preferred embodiment of the electrical fitting to provide a means for securing an electrical cable to the fitting. The clip member 124 or tandem tang includes a leading tang 140, a trailing tang 142, and a common middle section 144.

Figure 74:
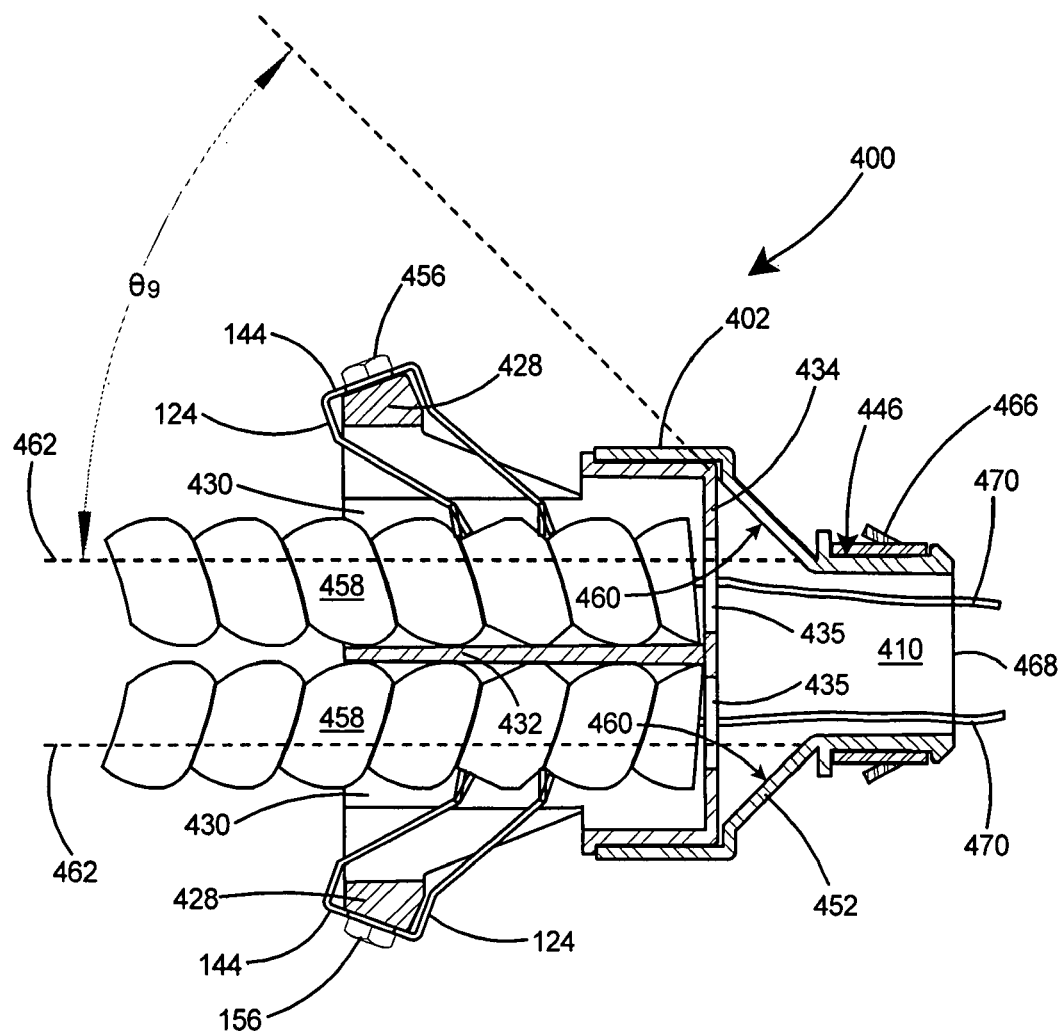
FIG. 74 is a sectional view of the preferred embodiment of an electrical fitting according to the present invention including two cables inserted therein.

Referring to FIG. 74, the preferred embodiment of the electrical fitting 400 is shown with a clip member 124 fastened at its common middle section 144 to the inclined surface 438 of the bridge 428 by fastener 456. The clip member 124 on the connector body 402 provides a means for securing an electrical cable 458 in each of the inlet bores 430.

As shown in FIG. 74, the shoulder 452 of the electrical fitting 400 includes an inner arcuate surface 460 therein. The inlet bores 430 include central axes 462 as shown and the axes 462 and the inlet bores 430 of the electrical fitting 400 are substantially parallel to one another. The outlet bore 410 is substantially centered laterally on the longitudinal wall 432. Each central axis 462 of the inlet bores 430 extends through the opening 435 in the transverse wall 434. The central axis 462 of each of the inlet bores 430 intersects the inner arcuate surface 460 of the connector body 402.

With reference to FIG. 74, the electrical fitting 400 includes an attachment arrangement 464 on the nose portion 408 of the connector body 402 for attaching the electrical fitting 400 to a knockout in an electrical panel or electrical box (not shown). The attachment arrangement 464 may be a snap ring 466, which is disposed in the cylindrical seat 446. Alternatively, as shown in FIGS. 47A and 47B, the attachment arrangement 284 may include a threaded nose portion 286 on the connector body and a lock nut 288 for engaging the threaded nose portion 286.

With reference to FIG. 73, the leading body portion 404 and trailing body portion 406 of the preferred embodiment are each typically formed by die-casting and die-casting alloys are the most preferred material of construction. A most preferred material of construction for the leading and trailing body portions is Zamak™, a casting alloy comprised mainly of zinc alloyed with aluminum, magnesium, and copper and available from Eastern Alloys, Maybrook, N.Y. As shown in FIG. 73, the skirt 448 of the leading body portion 404 is typically slipped over the front portion 420 of the trailing body portion 406 and secured together by fastener 454 to form the connector body 402 of the present invention (see FIG. 64).

After the two body portions 404 and 406 are secured together to form the connector body 402, as shown in FIG. 64, a snap ring 466 may be secured to the nose portion 408 of the connector body 404 and a pair of clip members 124 may be secured to each bridge 428 that bridges over the open channels 426 at the trailing end 412 of the connector body 404. As an alternative to the snap ring 466 for securing the fitting 400 to a panel or box, the connector body 404 may include a threaded nose portion 286 and a lock nut 288 as shown in FIGS. 47A and 47B.

For operation of the preferred embodiment of the electrical fitting 400, reference is made to FIG. 74. The leading end 468 of the electrical fitting 400 is pressed into a knockout in a panel (not shown) and secured thereto by the snap ring 466. An installer then inserts an electrical cable 458 into each inlet bore 430 of the fitting 400. The electrical cables 458 include wire conductors 470 at their leading ends. The large oval-shaped openings 435 in the transverse wall 434 enable easy passage of the wire conductors 470 through the transverse wall 434. At full insertion, the electrical cables 458 are stopped in their forward travel by the transverse wall 434. The wire conductors 470 pass through the openings 435 and into the single outlet bore 410. If any of the wire conductors 470 are positioned laterally outside the axes 462, the inner arcuate surface 460 of the fitting 400 directs the conductor 470 into the outlet bore 410. Thus the combination of the oversized openings 435 and the inner arcuate surface 460 enable easy insertion of the electrical cables 458 and passage of the wire conductors 470 through the preferred embodiment of the electrical fitting 400. The easy insertion feature of the present invention is of great advantage to an installer in the field as insertion of cables in many prior art fittings is difficult.

As shown in FIG. 74, the angle $\theta_9$ of the arcuate surface 460 with respect to the inlet bore axis 462 is of importance to insure that the wire conductors 470 are directed into the outlet bore. Preferably the angle $\theta_9$ of the arcuate surface 460 with respect to the inlet bore axis 462 is between 10 and 50 degrees. Most preferably the angle $\theta_9$ is 45 degrees.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting comprising:
    a connector body including a leading end portion and a trailing end portion;
    a nose portion including an outlet bore on said leading end portion of said connector body;
    said trailing end portion including two inlet bores separated by a longitudinal wall, said inlet bores having forward ends;
    a transverse wall at said forward end of said inlet bores;
    an opening in said transverse wall at said forward end of each of said inlet bores;
    a shoulder connecting said trailing end portion to said leading end portion;
    an attachment arrangement on said nose portion for attaching said electrical fitting to a panel; and
    a clip member on said trailing end portion of said connector body for securing an electrical cable in each of said inlet bores.

2. The electrical fitting of claim 1 wherein said shoulder includes an inner arcuate surface therein.

3. The electrical fitting of claim 1 including
    a sidewall and a midportion on said trailing end portion;
    an open channel extending through said sidewall into each of said inlet bores; and
    said open channels extending from said trailing opening to said midportion, said open channels including a bottom therein.

4. The electrical fitting of claim 3 including
    a bridge adjacent said trailing opening bridging said open channel, and
    said clip member secured to said bridge.

5. The electrical fitting of claim 4 including two ramps extending outwardly and rearwardly from said midportion of said connector body to provide support for said bridge.

6. The electrical fitting of claim 1 wherein said clip member includes
    a leading tang;
    a trailing tang; and
    a common middle section.

7. The electrical fitting of claim 4 wherein said bridge includes an inclined surface for receiving and attaching said clip member at said common middle section.

8. The electrical fitting of claim 1 wherein said nose portion of said connector body includes a cylindrical seat thereon.

9. The electrical fitting of claim 1 wherein
    said nose portion includes a cylindrical seat thereon; and
    said attachment arrangement is a snap fitting in said cylindrical seat.

10. The electrical fitting of claim 1 wherein said attachment arrangement includes
    a threaded portion on said nose portion of said connector body; and
    a lock nut for engaging said threaded nose portion.

11. The electrical fitting of claim 1 wherein said inlet bores are substantially parallel to one another.

12. The electrical fitting of claim 1 wherein said outlet bore is centered laterally on said longitudinal wall.

13. The electrical fitting of claim 1 wherein
    said openings in said transverse wall are substantially oval-shaped;
    said oval-shaped openings include long sides; and
    said long sides are substantially parallel to said longitudinal wall.

14. The electrical fitting of claim 2 wherein
    each of said inlet bores include a central axis; and
    said central axis of each of said inlet bores extends through said opening in said transverse wall; and
    said central axis of each of said inlet bores intersects said inner arcuate surface of said connector body.

* * * * *